(12) United States Patent
Lev et al.

(10) Patent No.: US 11,921,254 B2
(45) Date of Patent: Mar. 5, 2024

(54) OPTICAL SEISMIC SURVEYING SYSTEM

(71) Applicants: ELBIT SYSTEMS LAND AND C4I LTD., Netanya (IL); SOREQ NUCLEAR RESEARCH CENTER, Yavne (IL)

(72) Inventors: Aner Lev, Modiin (IL); Shai Mordechai Butzin, Netanya (IL); Barak Alfassi, Netanya (IL); Alon Refael Heimer, Netanya (IL)

(73) Assignees: ELBIT SYSTEMS LAND AND C4I LTD., Netanya (IL); SOREQ NUCLEAR RESEARCH CENTER, Yavne (IL)

( * ) Notice: Subject to any disclaimer, the term of this patent is extended or adjusted under 35 U.S.C. 154(b) by 148 days.

(21) Appl. No.: 17/667,869

(22) Filed: Feb. 9, 2022

(65) Prior Publication Data
US 2022/0342110 A1    Oct. 27, 2022

Related U.S. Application Data

(63) Continuation of application No. PCT/IL2020/050870, filed on Aug. 9, 2020.

(30) Foreign Application Priority Data

Aug. 12, 2019 (IL) .......................................... 268654

(51) Int. Cl.
*G01V 8/26*     (2006.01)
*G01H 9/00*    (2006.01)
(Continued)

(52) U.S. Cl.
CPC .............. *G01V 8/26* (2013.01); *G01H 9/002* (2013.01); *G01V 1/34* (2013.01); *G01V 11/00* (2013.01); *G01V 2210/74* (2013.01)

(58) Field of Classification Search
CPC ... G01V 8/26; G01V 8/20; G01V 8/10; G01V 8/12; G01V 8/18; G01V 8/14; G01V 1/34;
(Continued)

(56) References Cited

U.S. PATENT DOCUMENTS

| 3,370,268 A | 2/1968 | Dobrin et al. |
| 6,373,522 B2 | 4/2002 | Mathews et al. |

(Continued)

OTHER PUBLICATIONS

Ruting Jia et al, "System Performance of an Inertially Stabilized Gimbal Platform with Friction, Resonance, and Vibration Effects", Hindawi Journal of Nonlinear Dynamics, vol. 2017, Article ID 6594861, 20 pages, doi.org/10.1155/2017/6594861 (2017).

(Continued)

*Primary Examiner* — Daniel L Murphy
*Assistant Examiner* — Amie M Ndure
(74) *Attorney, Agent, or Firm* — Browdy and Neimark, PLLC

(57) ABSTRACT

An optical seismic surveying system including, a multibeam laser source including a plurality of laser-sources, a Diffractive-Optical-Element (DOE), an imager and a processor. The laser-sources direct respective laser-beams toward a single common focal point. The DOE is located at a single common focal point and configured to split each laser-beam into a plurality of laser-beams, toward an instantaneous area of interest. The laser-beams impinging on the instantaneous area of interest produce a laser spot assemblage including a plurality of laser spots. The imager acquires a plurality of defocused images of speckle patterns produced by diffused reflections of the laser spots. The speckle pattern correspond to a respective laser spot and thus to a respective sensing point in the instantaneous area of interest. The processor determines a relative displacement between corresponding (Continued)

speckle patterns in sequential pairs of images and determines a respective time-signal for each sensing point representing vibrations thereat.

22 Claims, 19 Drawing Sheets

(51) Int. Cl.
*G01V 1/34* (2006.01)
*G01V 11/00* (2006.01)

(58) Field of Classification Search
CPC ...... G01V 1/345; G01V 11/00; G01V 11/005; G01V 11/007; G01V 2210/74; G01V 2210/72; G01V 1/28; G01V 1/364; G01V 1/003; G01H 17/00; G01H 13/00; G01H 11/02; G01H 11/06; G01H 11/08; G01H 11/04
USPC .......................................................... 367/7
See application file for complete search history.

(56) References Cited

U.S. PATENT DOCUMENTS

| | | | |
|---|---|---|---|
| 6,809,991 | B1 | 10/2004 | Pepper et al. |
| 6,830,184 | B2 | 12/2004 | Tsikos et al. |
| 7,190,635 | B1 | 3/2007 | Killinger |
| 7,583,387 | B2 | 9/2009 | Meldahl et al. |
| 7,586,584 | B2 | 9/2009 | David et al. |
| 8,059,340 | B2 | 11/2011 | Khan et al. |
| 8,797,828 | B1* | 8/2014 | Lev .......................... G01V 8/00 356/497 |
| 8,842,735 | B2 | 9/2014 | Robertson et al. |
| 8,896,843 | B2 | 11/2014 | Rohner et al. |
| 10,054,430 | B2 | 8/2018 | Mor et al. |
| 10,321,825 | B2* | 6/2019 | Leizerson ................ A61B 8/08 |
| 10,352,762 | B2* | 7/2019 | Carmon ................... G01H 9/00 |
| 2002/0097342 | A1 | 7/2002 | Hu |
| 2003/0189708 | A1 | 10/2003 | Chang |
| 2004/0040379 | A1* | 3/2004 | O'Donnell ............. A61B 8/481 73/24.01 |
| 2008/0007715 | A1 | 1/2008 | Meldahl et al. |
| 2009/0027625 | A1 | 1/2009 | Chen et al. |
| 2010/0081912 | A1* | 4/2010 | McKenna ............ A61B 5/1455 600/368 |
| 2016/0284904 | A1 | 9/2016 | Brunton et al. |
| 2017/0131430 | A1* | 5/2017 | Price ..................... G01N 21/31 |
| 2017/0205498 | A1 | 7/2017 | Pe'Er |
| 2018/0010907 | A1 | 1/2018 | Forster et al. |
| 2018/0168453 | A1* | 6/2018 | Leizerson ............. A61B 5/0064 |
| 2019/0365233 | A1* | 12/2019 | Leizerson .......... G01N 21/4788 |
| 2020/0371018 | A1* | 11/2020 | Leizerson .......... G01B 9/02094 |
| 2021/0116358 | A1* | 4/2021 | Leizerson ............... G06T 7/001 |

OTHER PUBLICATIONS

Gihoon Byun et al, "Virtual Source Array-Based Multiple Time-Reversal Focusing", Appl. Sci. 2018, 8, 99; doi: 10.3390/app8010099 www.mdpi.com/journal/applsci.

A. A. Kamshilin et al, "Statistics of dynamic speckles in application to distance measurements", Optical Review Mar. 2009, vol. 16, Issue 2, pp. 160-166.

Htoo Maung Maung et al, "Implementation of PIC Based Vehicle's Attitude Estimation System Using MEMS Inertial Sensors and Kalman Filter", Special Issue of the International Journal of the Computer, the Internet and Management, vol. 19 No. SP1, Jun. 2011.

Bertholdk. P. Horn et al, "Rigid Body Motion from Range Image Sequences" CVGIP: Image Understanding vol. 53, No. 1, January, pp. 1-13, 1991.

Valérie Lavign et al, "Step-Stare Image Gathering for High-Resolution Targeting" In Advanced Sensory Payloads for JAV (pp. 17-1-17-14). Meeting Proceedings RTO-MP-SET-092, Paper 17. Neuilly-sur-Seine, France: RTO. www.rto.nato.int/abstracts.asp. (2005).

A. Averbuch et al, "A unified approach to FFT based image registration", www.researchgate.net/publication/2558431, Feb. 2002.

Mike Lewis "How Much Stabilization is Required for the Broad Area Persistent Surveillance Application?" www.pv-labs.com/wp-content/uploads/2014/12/Stabilization-Requirements-for-Wide-Area-Persistent-Surveillance.pdf (2007).

Gianluca Ruffato et al, "Design, fabrication and characterization of Computer Generated Holograms for anti-counterfeiting applications using OAM beams as light decoders", Scientific Reports vol. 7, Article No. 18011 (2017).

Gianluca Ruffato et al, "Diffractive optics for combined spatial- and mode- division de multiplexing of optical vortices: design, fabrication and optical Characterization", Scientific Reports | 6:24760 | DOI: 10.1038/srep24760 (2016).

Dmitry Semenov, "Distance Sensing with Dynamic Speckles", Kuopio University Publications C. Natural and Environmental Sciences 228. 2008. 63 p.Environmental Sciences 228. 2008. 63 p.

Vyacheslav Aranchuk et al, "Multi-beam laser Doppler vibrometry for acoustic landmine detection using airborne and mechanically-coupled vibration", Proceedings of SPIE—The International Society for Optical Engineering 5794—Jun. 2005.

\* cited by examiner

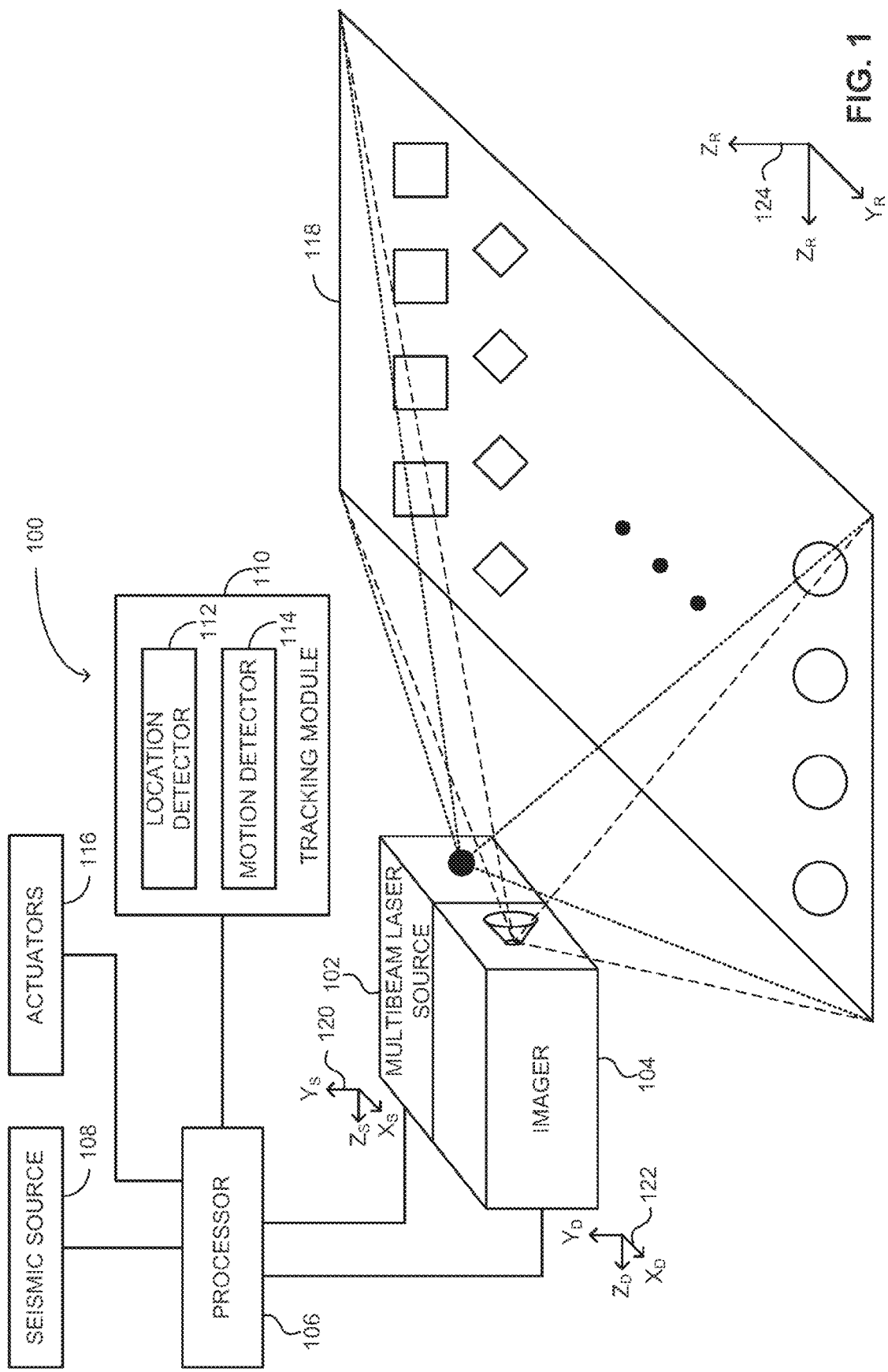

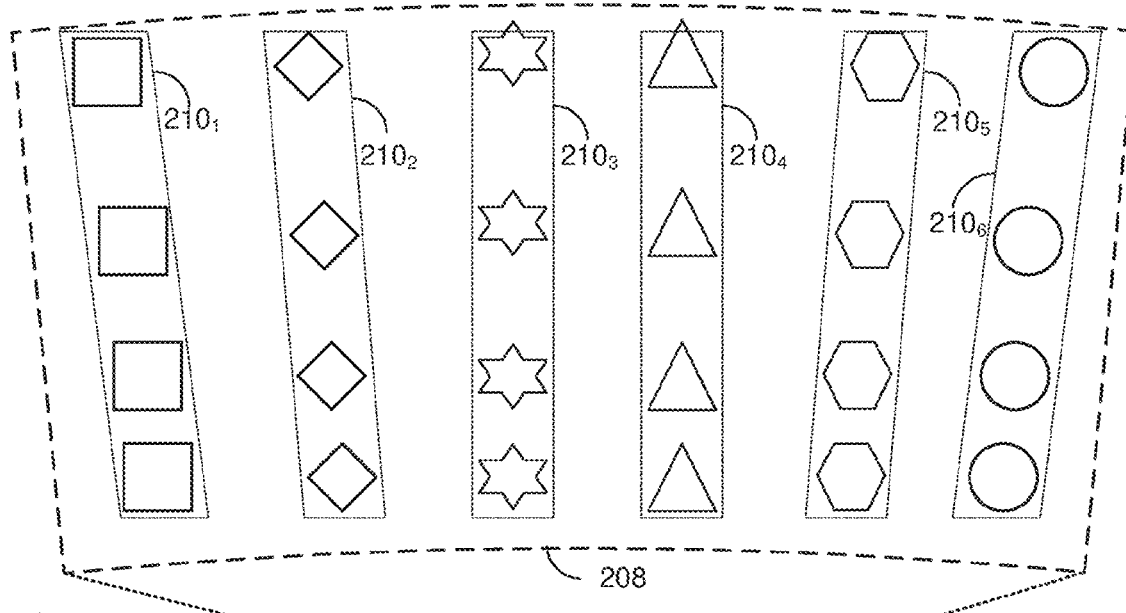
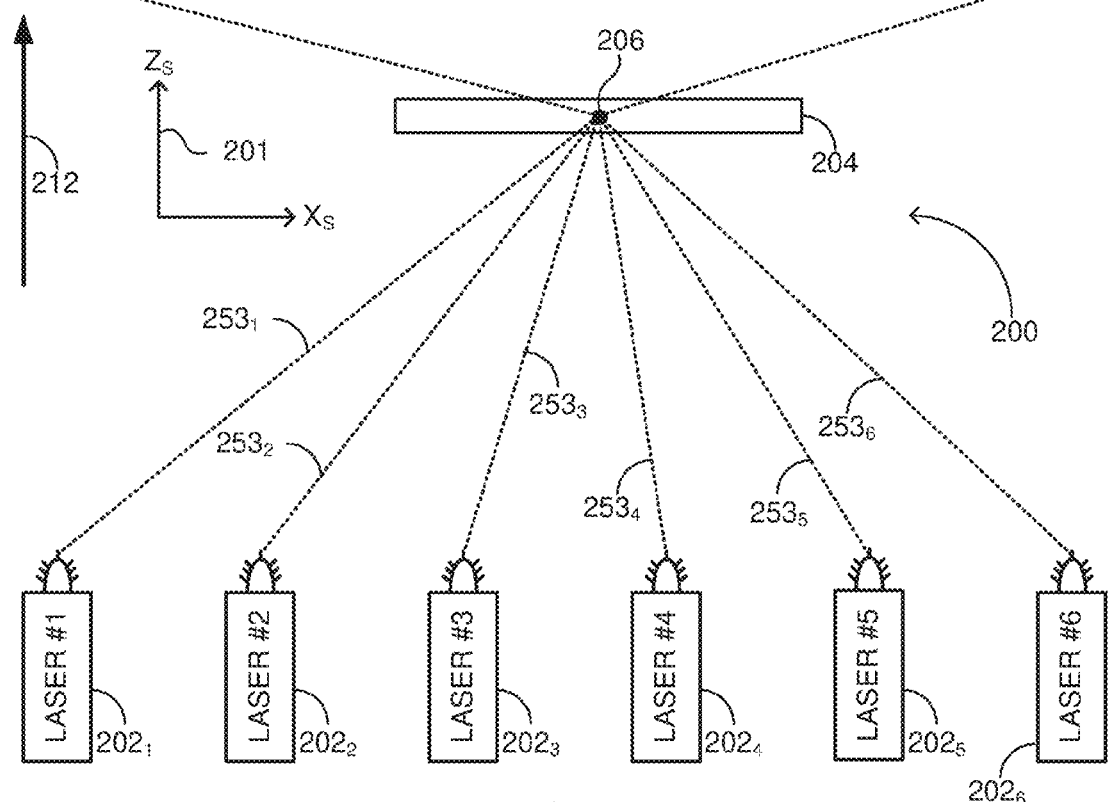
FIG. 3B
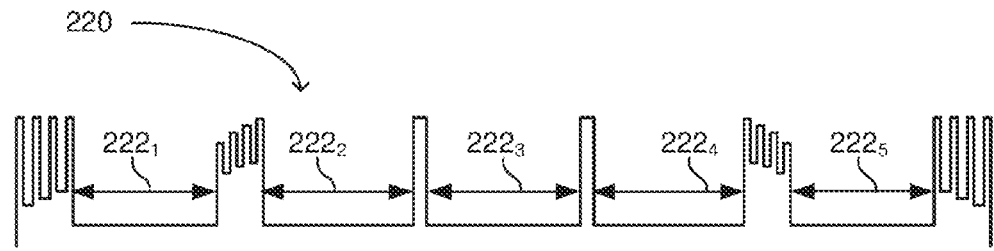
FIG. 3C

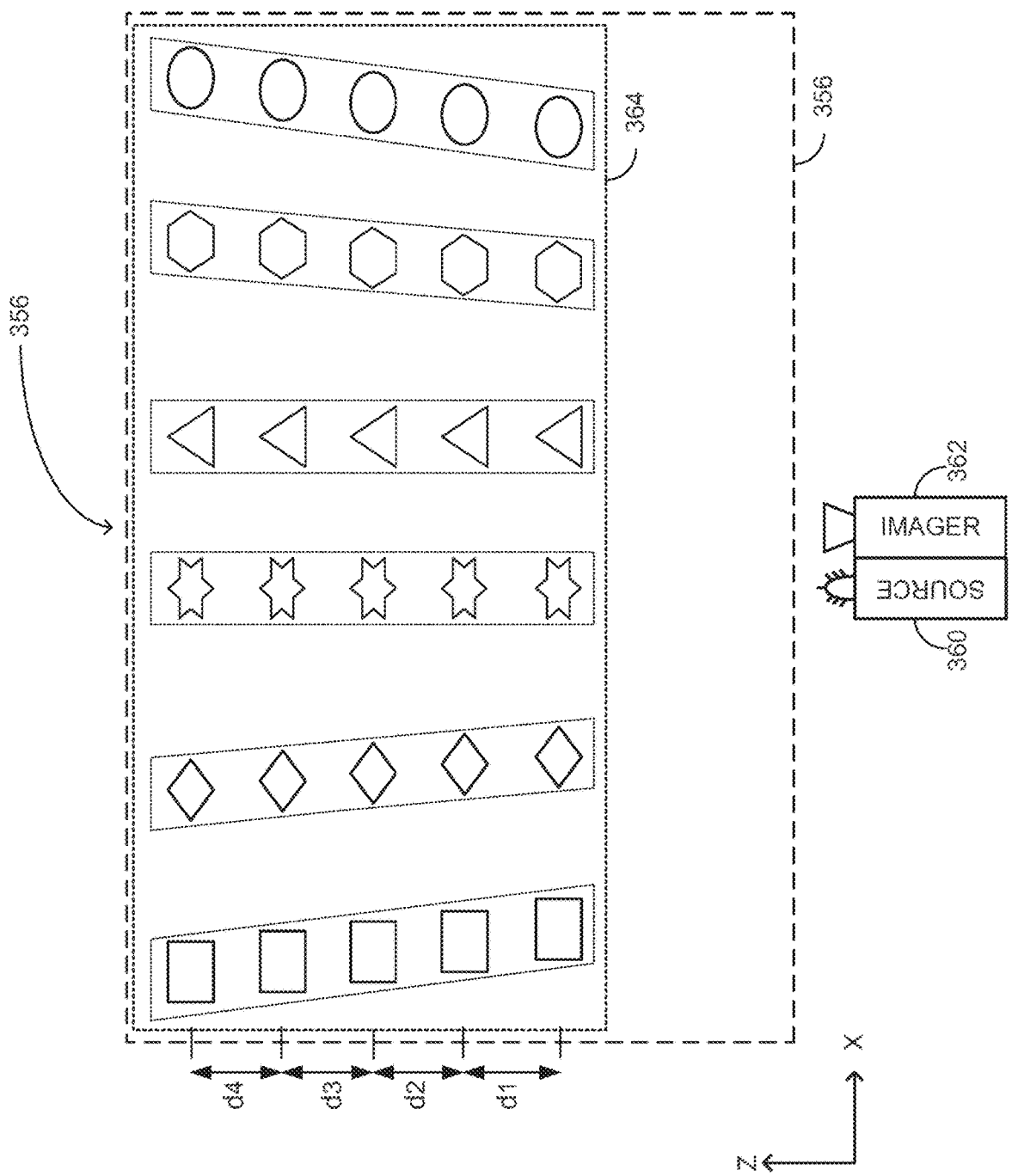

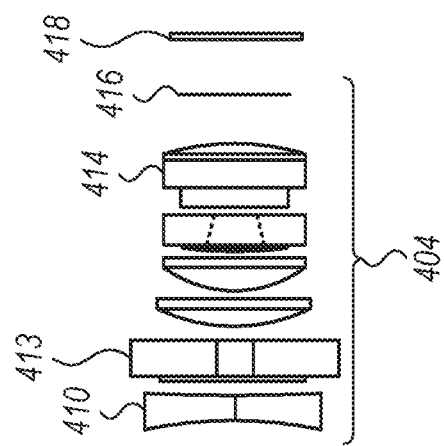
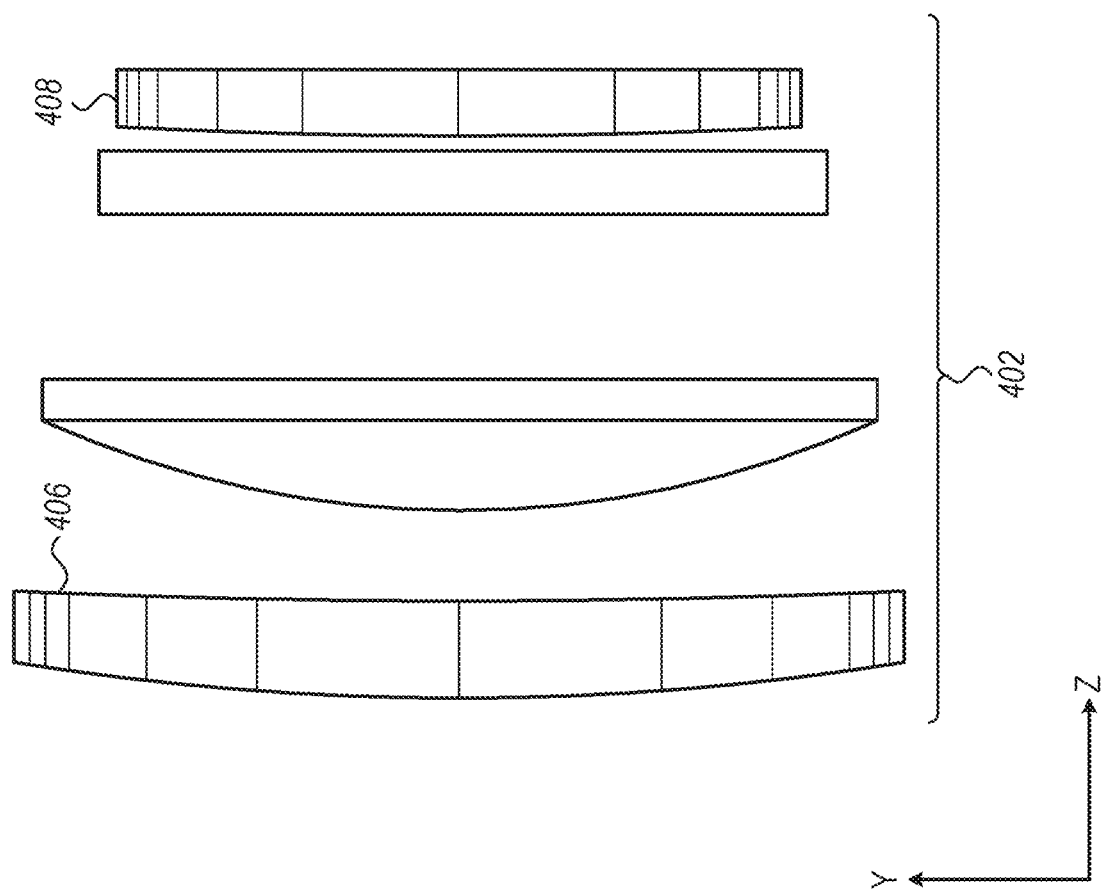
FIG. 7A

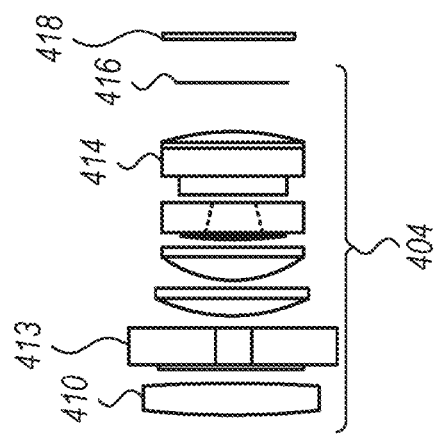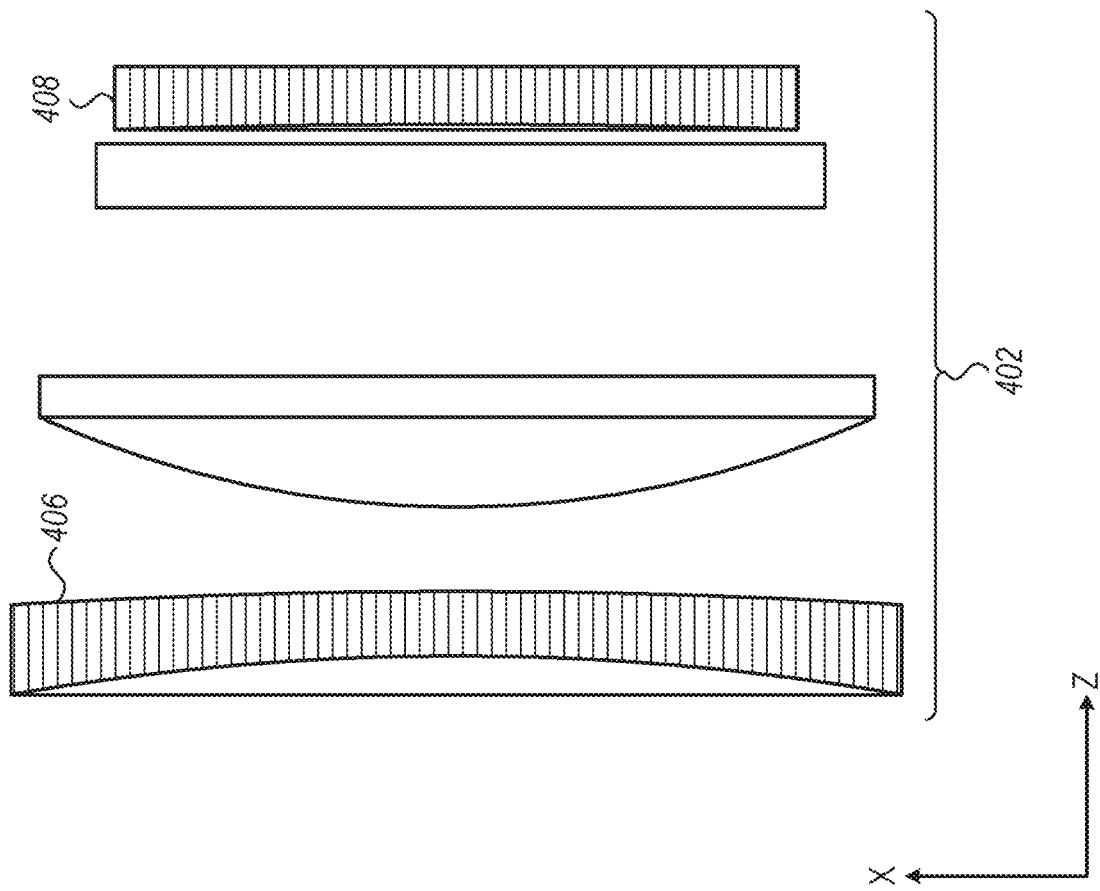
FIG. 7B

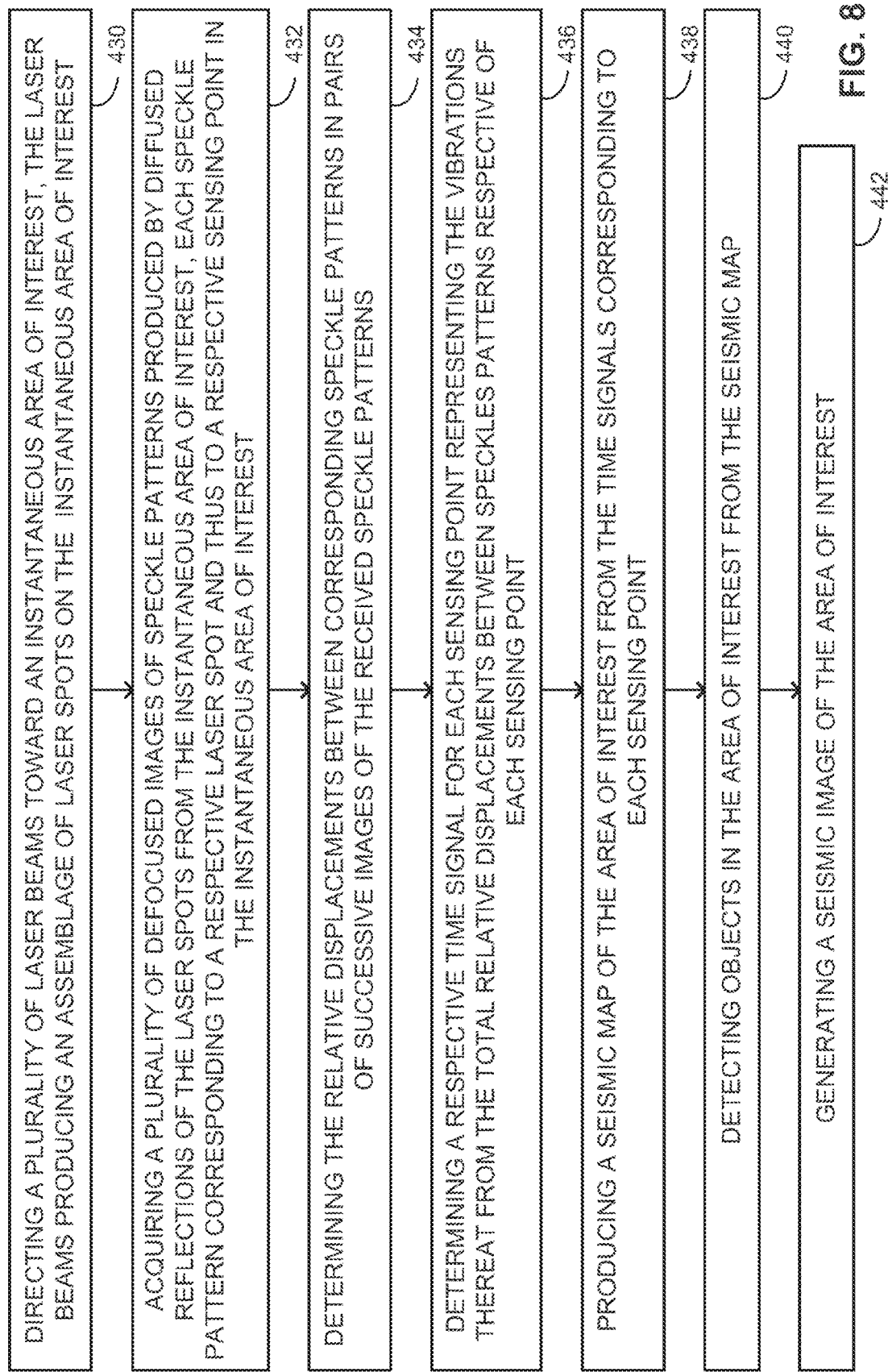

OPTICAL SEISMIC SURVEYING SYSTEM

FIELD OF THE DISCLOSED TECHNIQUE

The disclosed technique relates to optical seismic surveying, in general, and to methods and systems for remotely surveying an area of interest using seismic waves, imaging and optics and for detecting and imaging underground objects, in particular.

BACKGROUND OF THE DISCLOSED TECHNIQUE

Detecting underground objects is a challenge since such objects are not visible to the human eye. Such underground objects may also present a threat. Underground objects include, for example, buried rocks, underground cavities, air pockets, archaeological artifacts (e.g., buried buildings, buried mills and the like). Underground objects may also be changes in the changes in ground composition which may pose a threat to heavy equipment and personnel, such as muddy terrain, swamps, quicksand and the like.

One known method for detecting underground objects is underground imaging using techniques taken from the fields of mineral and oil exploration. In such techniques, a geological survey is taken of an area or region of interest. Based on the geological survey, an image of the ground and what lies beneath can be reconstructed and objects or threats in the ground can be determined. In general, geological surveys are major operations which take a significant amount of time to set up and complete. Also, field experts are usually required to read the geological surveys and interpret the data to determine what objects lie in the ground beneath.

Another known method for detecting underground objects is seismic mapping. In this method, devices known as geophones, which so can detect and record seismic responses of the ground over time are positioned in the ground in an area of interest. Geophones are in general inserted into the ground and set up in an array format. One or more seismic sources are then used to generate seismic waves over a period of time in the area of interest. The seismic sources can be manually or hydraulically activated hammers. The seismic waves are substantially reflected and diffracted by objects, open spaces and general differences in ground composition. The geophones which were placed in the ground are synchronized with one another and detect the seismic responses of the area of interest based on the reflections and diffractions of the seismic waves received. Algorithms are then used to extract the underground structure of the area of interest as well as the presence and position of any objects or open spaces in the ground. These algorithms substantially reconstruct a seismic map of the ground under the area of interest. This method is precise and accurate and can be used to detect objects in a significantly large area of interest in a single survey. At the same time, this method is difficult to implement practically to detect underground objects in real-time as the set up time of installing and placing the geophones in the ground is too lengthy and slow, for example, during a emergencies. In addition, setting up an array of geophones for seismic mapping is usually a costly and cumbersome procedure, as the array needs to be checked and calibrated before it can be used to record seismic responses. Such a set up can take days to prepare and fully install, although once prepared, seismic measurements can be taken almost instantaneously.

A further known method for detecting underground objects employs Ground Penetrating Radar (herein abbreviated GPR). In GPR, electromagnetic waves in the 1-100 kilohertz (herein abbreviated kHz) range are directed towards an area of interest. In this frequency range, the electromagnetic waves can penetrate the ground up to tens of meters. Reflections from these electromagnetic waves are received and can be used to determine the structure of the ground up to tens of meters below the surface of the ground, including the detection of objects. In general, GPR systems need to be in close proximity to the area of interest, usually within ten meters of the ground. Therefore, an area of interest in which it is suspected that it may contain underground objects must be scanned by a GPR system, which is a procedure that can be time consuming.

Another known system for detecting underground objects, is the laser Doppler vibrometer (herein abbreviated LDV). LDV systems are based on interferometry and substantially measure Doppler shifts between a laser beam aimed at a target surface and a reference beam. LDV systems are very sensitive and can detect nanometer size vibrations on a target surface. LDV systems are ineffective, specifically for determining a seismic map for underground object detection when operating in sharp grazing angles and long distances. An LDV system is then used to measure differences in frequency of the laser beam directed at the region of interest and a reference beam, thereby generating a seismic map.

Other systems for remotely detecting underground objects are known in the art. U.S. Pat. No. 6,809,991 issued to Pepper, et al., entitled "Method and apparatus for detecting hidden features disposed in an opaque environment," is directed to a system for remotely locating and identifying features disposed within an opaque environment, such as a objects buried under the surface of the ground. The system includes two laser sources, a vibration sensor module and a signal processing unit. One laser source produces a modulated exciter beam with the other being a probe beam. The signal processing unit receives signal information from the vibration sensor module and controls the modulation of the exciter beam.

The exciter laser periodically emits a modulated beam which, upon absorption in the ground, generates an wave which propagates along the surface of the ground as well as in the subsurface. The wave is produced through thermoelastic and/or ablative effects. The modes within the ground are scattered due to in-homogeneities such as buried objects. The spectrum generated in the ground substantially replicates the modulation format of the exciter laser. A small portion of the scattered waves travels back to the surface resulting in small but detectable vibrations. The probe laser detects these vibrations as the laser beam impinges on the surface of the ground and a small portion of the laser beam is reflected back by the surface towards the system. The vibrations of the surface are superimposed on the reflected beam. The reflected beam is provided to the vibration sensor module which converts the light wave into an electric signal. The electric signal is supplied to the signal processing unit. The information in the electric signal is representative of the vibrations at the surface which in turn is representative of a buried object. The signal processing unit analyzes the signal and determines what type of object is buried in the ground by comparing the information in the received signals to a set of predetermined data patterns. The predetermined data patterns correspond to a variety of different objects which might be encountered, such as a rock, a tree root and so forth.

The processor selects an object and changes the characteristics of the exciter laser beam in order to adjust the generated waves so as to achieve modes that best couple with the selected object. By analyzing the information received from the vibration sensor module after the change in characteristics, the processor verifies its selection. The processor may reject its selection and try various other characteristics of the exciter laser beam in order to determine what object is buried in the ground.

U.S. Patent Application Publication No. 2003/0189708 to Chang, entitled "Antitank mine detection system for armored vehicle" is directed to a system for armored vehicles for remotely detecting antitank mines. The system includes an armored vehicle for carrying the optical and electronic components of the system. The armored vehicle is also used as an exciter for seismic waves. The system also includes an optical source body disposed on the front end of the armored vehicle, a sensor disposed on the side of the optical source body and a controller which controls the radiation from the optical source body as well as the speed of the armored vehicle. The controller includes a data processing part for converting an image received by the sensor to an electric signal and for processing it.

The body of the armored vehicle, along with its load, serves as a source for seismic wave motion which is distorted due to the presence of an antitank mine. The distortion is located by the system by measuring fluctuations of the ground. The optical source produces two laser beams, an object beam which is directed to the ground and a reference beam. Part of the object beam is reflected back towards the sensor. The reflected object beam and the reference beam are collected by the sensor, thereby obtaining an interference speckle image. The image is then processed in real-time by the data processing part which detects the point where the wave motion is distorted. By comparing the data collected from the interference speckle image with existing data stored therein, the processor determines whether the object distorting the wave motion is an antitank mine or a rock.

U.S. Pat. No. 7,583,387 issued to Meldahl, et al., entitled "Seismic exploration" is directed to a system and method for seismic exploration and seismic imaging by using a moving laser interferometer, in particular for use in submarine seismic exploration. The system comprises an interferometer which includes a source of coherent object light, a source producing a reference beam which is coherent with the object beam, and a detector or array of detectors. Additionally, the method may include a step of generating a seismic event such that the system can detect the response to the event.

An object beam is sent from the interferometer towards an inspected surface, e.g. the sea bed. Part of the object beam is reflected back up towards the interferometer where it is combined with a reference beam to illuminate a detector. In the case where an array or a line of detectors is used the reference beam, or a set of combined spatially distributed reference beams, must cover the whole array. The combination of the object beam and the reference beam creates an interference pattern that is detected by the detector. The signals from all of the detectors are digitized and fed to a processor which calculates the movement of the inspected surface.

The object beam sent from the interferometer is first expanded and then arranged to converge at a point which is approximately the same distance beyond the measured surface as the surface is spaced from the beam source. This feature and other means, such as modulating the reference beam, allow the system to measure the movement of the surface while in motion, for example by being towed by a ship. The speed of motion of the interferometer, the sampling rate of the detectors and the size of the area illuminated by the object beam are arranged so that sequential areas of the surface overlap.

SUMMARY OF THE PRESENT DISCLOSED TECHNIQUE

It is an object of the disclosed technique to provide a novel method and system for optical seismic surveying. In accordance with an aspect of the disclosed technique, there is thus provided an optical seismic surveying system including a multibeam laser source, an imager and a processor. The processor is coupled at least with the imager. The multibeam laser source includes a plurality of laser sources and a Diffractive Optical Element. The plurality of laser sources are configured to direct respective laser beams toward a single common focal point. The Diffractive Optical Element is located at the single common focal point. The Diffractive Optical Element is configured to split each of said laser beams into a plurality of laser beams and to direct the laser beams toward an instantaneous area of interest. The laser beams impinge on the instantaneous area of interest and produce a laser spot assemblage. The laser spot assemblage includes a plurality of laser spots. The imager is directed toward the instantaneous area of interest. The imager includes an optical assembly and an imaging sensor. The imager is configured to acquire a plurality of defocused images of speckle patterns produced by diffused reflections of the laser spots from the instantaneous area of interest toward said imager. Each speckle pattern corresponds to a respective laser spot and thus to a respective sensing point in the instantaneous area of interest. The processor is configured to determine a relative displacement between corresponding speckle patterns in sequential pairs of images. The processor is further configured to determine a respective time signal for each sensing point representing the vibrations thereat from the relative displacements between speckles patterns respective of each sensing point.

In accordance with another aspect of the disclosed technique, there is thus provided a seismic surveying method. The method includes the procedures of directing by a multibeam laser source a plurality of laser beams toward an instantaneous area of interest, the laser beams producing an assemblage of laser spots on the instantaneous area of interest, and acquiring a plurality of defocused images of speckle patterns produced by diffused reflections of the laser spots from the instantaneous area of interest, each speckle pattern corresponding to a respective laser spot and thus to a respective sensing point in the instantaneous area of interest. The method further includes the procedures of determining relative displacements between corresponding speckle patterns in pairs of sequential images of received speckle patterns and determining a respective time signal for each sensing point representing the vibrations thereat from the total relative displacements between speckle patterns respective of each sensing point. The procedure of determining relative displacements between corresponding speckle patterns includes the sub-procedure of estimating a course displacement between the corresponding speckle patterns in each sequential pair of images and aligning each pair of sequential images with each other according to the course spatial displacement estimation. The procedure of determining relative displacements between corresponding speckle patterns further includes the sub-procedure of determining a fine displacement between the corresponding speckle patterns in each pair of sequential images and estimating a total relative displacement between each pair of sequential images by combining the estimated coarse relative displacement and the determined fine relative spatial displacement with the highest cross-correlation value.

BRIEF DESCRIPTION OF THE DRAWINGS

The disclosed technique will be understood and appreciated more fully from the following detailed description taken in conjunction with the drawings in which:

FIG. 1, is a schematic illustration of a seismic surveying system for detecting and imaging underground objects, constructed and operative in accordance with an embodiment of the disclosed technique;

FIGS. 3A and 3B are a schematic illustration of a multibeam laser source, constructed and operative with a further embodiment of the disclosed technique;

FIG. 3C is a schematic illustration of a graph depicting light intensity coverage of a laser multibeam laser source projected on ground, during motion along the Zs axis, also in accordance with a further embodiment of the disclosed technique;

FIG. 6B, which is a schematic illustration of a laser spot assemblage, also in accordance with another embodiment of the disclosed technique;

FIGS. 7A and 7B, which are a schematic illustration of an optical arrangement employing asymmetric optics for FOV compression constructed and operative in accordance with a further embodiment of the disclosed technique.

FIG. 8 is a schematic of a method for seismic surveying, operative in accordance with another embodiment of the disclosed technique;

DETAILED DESCRIPTION OF THE EMBODIMENTS

Figure 2A:
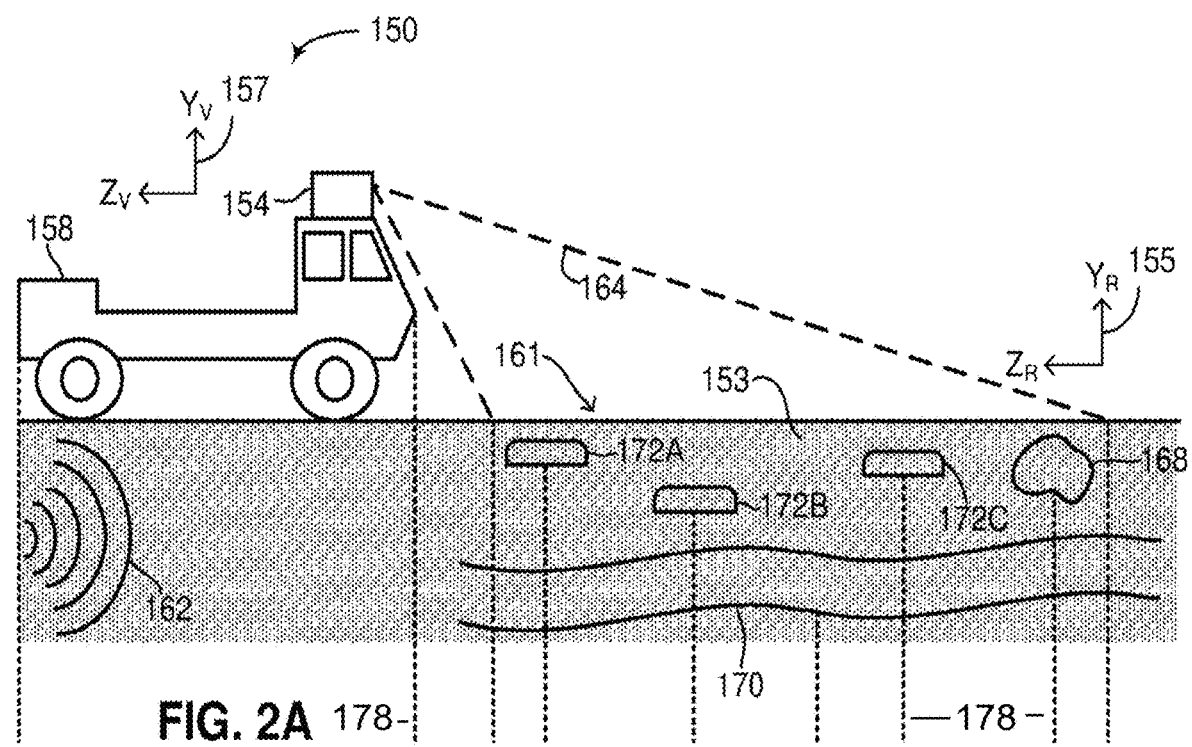
FIGS. 2A, 2B and 2C are schematic illustration of an exemplary a seismic surveying system employed to detect and image underground objects, constructed and operative in accordance with another embodiment of the disclosed technique.

The disclosed technique overcomes the disadvantages of the prior art by providing a novel system and method for seismic surveying. According to the disclosed technique, a laser beam or an array of laser beams illuminate an area of interest, while a seismic or wave propagates through the area of interest, such that an assemblage of laser spots is formed on the ground of the area of interest from the laser beams which impinge of the area of interest. This assemblage of laser spots may exhibit the form of a matrix of laser spots (also referred to herein a 'laser spots matrix'). According to one example, the laser beam may be scanned across the area of interest to create the assemblage of laser spots. According to another example, the assemblage of laser spots may also be scanned across the area of interest. An imager acquires images of (i.e., receives and detects) a speckle pattern or speckle patterns corresponding to reflections of each of these laser spots from the ground of the area of interest. The vibrations of the ground, and specifically the tilt vibrations, due to the seismic wave cause shifts in the received speckle patterns. The shifts in each received speckle pattern are then used to determine a respective time signal associated with each sensing point. The term "seismic sensing point" or just "sensing point" relates herein to the location of a laser spot on the object (e.g., the ground) at which the tilt vibrations thereof are measured. The properties of the seismic wave (e.g., amplitude, phase, velocity) can be determined from the time signals representing the tilt vibrations at the various sensing points.

From the time signals representing the vibrations at each sensing point, a seismic map of the area of interest can be determined in real-time. The term 'seismic map' or 'seismic data' refers herein to information relating the amplitude, frequency and phase of a seismic wave, which propagated through an area of interest, as manifested by vibrations of the area of interest, and specifically of tilt vibrations, as a function of distance from a detector, and time. The novel system and method according to the disclosed technique enables to remotely generate a seismic map for an area of interest without imager being in physical contact with the ground of the area of interest. Thus, the disclosed technique can be referred to as a technique for optical seismic surveying. The seismic map may be a single point, a 1D map or a 2D map of the area of interest. The seismic map can be employed to detect underground object and further be employed to generate a seismic image of the area of interest, and the underground objects of various sizes.

According to one embodiment of the disclosed technique, the assemblage of laser spots is generated by a multibeam laser source, which employs a plurality of laser sources, directing the respective laser beams thereof toward a single common focal point, and a Diffractive Optical Element (DOE) located at this single common focal point (i.e., within a tolerance). The DOE is employed as a beam splitter which splits each of the laser beams to a plurality of respective beams, to generate the assemblage of laser spot at the area of interest. In general, DOE's employ a micro structure pattern or patterns to alter the phase of light propagating there through. By properly designing the phase pattern of the DOE, the light propagating through the DOE can be manipulated to a desired intensity profile or profiles (i.e., a light pattern or light patterns).

According to the disclosed technique, the plurality of laser sources, directing the respective laser beams thereof toward a single common focal point, are employed instead of a single laser source. The required output power from a single laser source may render such a laser source impractical (e.g., due to price or availability). When employing a plurality of laser sources, the output power of each laser source may be lower than the required output power from the DOE. However, the combined power of all the laser sources, directing the respective beams thereof at a single common focal point, can achieve the required output power from the DOE with practical laser sources.

As mentioned above, a multibeam laser source illuminates an area of interest with an assemblage of laser spots. The detection resolution of the seismic surveying system is defined by the distance between adjacent sensing points. When a single pulse seismic wave propagates through the area of interest, the distance between two adjacent sensing points should typically be at least 2 to 3 times smaller than the smallest object which is sought to be detected in the area of interest. In other words, the smallest detectable object is 2 to 3 times larger than the distance between adjacent sensing points. As further explained below in conjunction with FIGS. 4A-4C, this detection resolution can be achieved, even if the distance between adjacent sensing points (i.e., the assemblage of laser spots being projected on the ground and in which tilt vibrations are measured) is larger than twice the smallest object to be detected. Conversely, the detection resolution may be increased for the same separation between sensing points, thus enabling the detection of smaller objects.

According to the disclosed technique, underground objects can be detected by determining changes in the properties of the propagated seismic wave over time. Different types of objects change the properties of the propagated seismic wave in different ways. The frequency composition of the propagated seismic wave can be used to determine the size of underground objects. In general, the size of underground objects is inversely proportional to the frequency of the seismic wave reflected by the object, such that lower frequencies indicate substantially large objects and higher frequencies indicate substantially small objects. According to the disclosed technique, the seismic wave can be generated by a controlled or active seismic source (e.g., a large hammer repeatedly striking the ground) or an uncontrolled or passive seismic source, such as background seismic activity of the ground of the area of interest. A system according to the disclosed technique can determine differences in the speckle patterns relating to diffusive reflections from the laser spots, regardless of the type of seismic source which generated the seismic wave.

Throughout the description, the expression "area of interest" is used to denote an area or region of interest in which properties of a seismic wave propagating through the area of interest are to be determined. An area of interest herein substantially represents a volume of interest that includes the ground surface of the area of interest as well as what is beneath the ground surface. The term "instantaneous area of interest" is employed when the system according to the disclosed technique scans the area of interest by illuminating and imaging a succession of areas smaller than the area of interest. Each of these smaller areas is referred to as an "instantaneous area of interest". Instantaneous areas of interest may exhibit overlap therebetween. The area of interest as well an instantaneous area of interest may include underground objects. In addition, the expression "underground objects" as used in the description of the disclosed technique can refer to physical objects in the ground, such as rocks, ore. Underground objects can also refer to changes in ground composition, such as from rock to sand, or to open spaces, like covered holes and pits, cavities, caves, excavations that have been covered, and air pockets in the ground, archaeological artifacts (e.g., ancient buried buildings, old buried mills and the like). Underground objects can also be referred to as underground anomalies or underground abnormalities. In general, according to the disclosed technique, underground objects of varying sizes can be determined, in particular objects as small as 5 centimeters in length (e.g., rocks) or as large as 100 meters in length (e.g., ancient buried walls). In addition, underground objects may refer to any object underground having seismic impedance that is detectably different than the seismic impedance of the ground surrounding that underground object.

It is noted that according to the disclosed technique, no geophones need to be physically deployed in the ground to determine the seismic response of an area of interest. As such, a laser source for generating an assemblage of laser spots on the area of interest, as well as the image detector for detecting reflections from the laser spots can be located at a distance from the region of interest, for example hundreds of meters away, without being in direct physical contact with the area of interest. The disclosed technique thus alleviates the need for geophone infrastructure and increases operational flexibility. The disclosed technique also reduces the time and risk in surveying an area of interest for underground objects, especially when such underground objects include cavities, air pockets or change in ground composition (e.g., quick sand or swamp). In addition, since the disclosed technique uses seismic waves which naturally travel on the surface of the ground, the seismic source can also be situation at a distance from the area of interest.

Furthermore, according to the disclosed technique, since optics are used to substantially generate a seismic map, the imaging scale of the seismic map can be changed by changing the density of the assemblage of laser spots transmitted to the ground of the area of interest as well as the optical zoom of the detector used. Further according to the disclosed technique, the 'transmitter' (i.e., the multibeam laser source) and the 'receiver' (i.e., the imager and respective optical assembly) can be separated, thus enabling to separately configure each for the transmitter and the receiver, for example, with respect to the distance from the instantaneous area of interest (e.g., the receiver can be located closer to the instantaneous area of interest relative to the transmitter or vice versa). Also, according to the disclosed technique, multiple beams of light are used to generate the assemblage of laser spots. The number of beams of light employed enables accounting for a large number of sensing points and also enable real-time processing of the received reflections. It is also noted that the disclosed technique does not make use of a local oscillator, as is used in state-of-the-art vibrometers which mix a reflected beam of laser light with a source beam of laser light to determine a change in phase. In general, vibrometers require the use of lasers having very high coherence lengths. Such vibrometers may be very sensitive to air turbulence and clutters, which are known to be substantially strong near the surface of the ground. Furthermore, the disclosed technique makes use of secondary waves in analyzing the seismic response of an area of interest, which is unlike known geological surveying methods where secondary waves are usually eliminated from such methods. Specifically, while known in the art vibrometers measure transverse motion of the ground, the disclose technique measures 2D tilt of the surface and specifically the tilt angular velocity. Measuring 2D tilt is significant, for example, the level of destruction resulting from earthquakes relates more closely to tilt and tilt velocity rather than transvers velocity of the seismic wave.

Reference is now made to FIG. 1, which is a schematic illustration of a seismic surveying system generally referenced 100, for detecting and imaging underground objects, constructed and operative in accordance with an embodiment of the disclosed technique. System 100 includes a multibeam laser source 102, an imager 104 and a processor 106. System 100 optionally includes a seismic source 108, a tracking module 110 and actuators 116. Tracking module 110 may include platform location detector 112 and platform motion detector 114 (i.e., the platform on which multibeam laser source 102 and imager 102 are mounted). System 100 also optionally includes actuators 116. Multibeam laser source 102 and imager 104 are each coupled with processor 106. When system 100 includes tracking module 110 or actuators 116, then these are also coupled with processor 106. When system 100 includes seismic source 108, than seismic source 108 is optionally coupled with processor 106. In other words, seismic source 108 may operate independently from processor 106. When seismic source 108 is coupled with processor 106, seismic source 108 may be either coupled physically or wirelessly with processor 106. Also, each of multibeam laser source 102 and imager 104 may be physically coupled with processor 106 or wirelessly coupled with processor 106 such that processor 106 can communicate with and control multibeam laser source 102 and imager 104. In this respect, the various elements of system 100 can be spread out and positioned in different locations with respect to an area of interest, thereby increasing the versatility of a system according the disclosed technique.

Multibeam laser source 102 includes a plurality of laser sources directing the respective laser beams thereof toward a single common focal point, and a DOE located at this single common focal point, as further elaborated below in conjunction with FIGS. 3A-3C, 4A-4C. The DOE is employed as a beam splitter which splits each beam incident thereon to a predetermined number of beams in a predetermined configuration. Thus, multibeam laser source 102 simultaneously directs the beams toward the area of interest or the instantaneous area of interest, such that an assemblage of laser spots 118 is created thereon. According to the disclosed technique, the use of a plurality of laser beams for illuminating the area of interest enables real-time imaging of the area of interest. Laser spots assemblage 118 represents a plurality of laser beams transmitted to different locations on the area of interest. Each laser beam is focused on the surface of the area of interest. The plurality of laser beams thus form an assemblage, or array of laser spots on the surface of the area of interest. The light from these laser spots reflects back toward imager 104. Each of the laser sources in multibeam laser source 102 is embodied as any laser having a coherence level high enough such that reflections from each laser spot in assemblage of laser spots 118 generate a speckle pattern on imager 104. In general, to maximize the speckle pattern contrast, the coherence length of each beam emanated by multibeam laser source 102, should be substantially larger from the maximal path differences between the minimum to maximum optical paths of each beam. Also, the laser generated by each laser source in multibeam laser source 102 does not need to be coherent with respect to the other laser sources. In addition, multibeam laser source 102 should illuminate the area of interest or the instantaneous area of interest with well-defined laser spots and with minimal laser radiation between adjacent laser spots (i.e., Signal-to-Background Noise Ratio is above a predetermined threshold).

Multibeam laser source 102 can be embodied as an array of laser diodes, in which each laser diode generates a laser beam toward the single common focal point, and illuminates a different location or different locations on the area of interest (i.e., thus, an assemblage of laser spots 118 is transmitted to the area of interest). Multibeam laser source 102 can also be embodied as a plurality of fiber lasers. The DOE is located at the single common focal point of the lasers (i.e., within a tolerance) and splits each beam of laser light propagating there through, into a plurality of beams. Thus, a matrix of laser spots exits the exit aperture of multibeam laser source 102, which are focused as laser spots assemblage 118 on the area of interest. In general, the DOE alters only the propagation direction of the beam, while maintaining the other characteristics of the laser light.

Multibeam laser source 102 can employ, for example, laser model ELR-50-1550-LP-SF from IPG photonics, lasing at eye-safe wavelengths and based on fiber laser technology. As another example, multibeam laser source 102 can employ single-mode Fabry-Perot diode lasers, such as laser diode model HL6548FG from Hitachi, lasing at near infrared wavelengths or at visible wavelengths. Another example could be the DFB diode lasers in product family AA1401 from EM4 Inc. (USA).

Imager 104 includes an imaging sensor which includes a plurality of imaging pixel, typically arranged in the form of matrix, capable of receiving reflections from laser spots assemblage 118 reflected from the surface of the area of interest. Imager 104 may be embodied as a high speed single detector, a high speed array of detectors or as a high speed camera. For example, high speed regarding the detector or the camera refers to a capture speed of 50 to 100,000 frames per second (herein abbreviated fps) and a shutter speed 20,000 to 1 microseconds (pS). In addition, when imager 104 is embodied as a high speed camera, then the camera should have a high gain and sensitivity, and have a minimal fixed pattern noise which reduces signal correlation. For example, imager 104 could be SWIR camera model Cheetah-640-CL from Xenics (Belgium) if multibeam laser source 102 transmits laser light in the short wave infrared wavelength range. As another example, imager 104 could be the Phantom v9.1 camera from Vision Research (Canada) if multibeam laser source 102 transmits light in the visible or near infrared wavelength range.

Each one of multibeam laser source 102 and imager 104 is associated with a respective frame of reference. Multibeam laser source 102 is associated with source frame of reference 120 ($X_S$, $Y_S$, $Z_S$) and imager 104 is associated with detector frame of reference 122 ($X_D$, $Y_D$, $Z_D$). In system 100, the orientation of multibeam laser source 102 is set such that the assemblage of laser spots 118 illuminates the ground at a selected distance from multibeam laser source 102 (i.e., a selected working distance). Imager 104 is than oriented such that imager 104 is directed toward laser spot assemblage 118. Area of interest frame of reference 124 may be a reference coordinate system such, WSG84, ETRS89, Israel Transverse Mercator—ITM, or a locally defined coordinate system.

Tracking module 110 provides information relating to the position and orientation of system 100 as well as information relating to the motion (e.g., accelerations, velocities) of system 100. Tracking module 110 may be a Global Positioning System (GPS) tracking module an Inertial Navigation System (INS) or a GPS-INS system. As such, platform location detector 112 provides information relating to the position of system 100 in reference coordinate system 124. Platform location detector 112 is, for example, a Global Positioning System (GPS) receiver operable to receive signals from GPS satellites and produce information relating to the position of system 100. Platform motion detector 114 provides information relating to the linear and angular motion of system 100. For example, platform motion detector 114 provides information relating to the linear and angular accelerations of system 100. Platform motion detector 114 may be embodied as an Inertial Measurement Unit (IMU), which includes accelerometers providing information relating to the linear acceleration of system 100 and gyroscopes, which provide information relating to the angular acceleration of system 100. These accelerations may be integrated to produce information relating to velocities and/or positions of system 100. As further explained below, these may further be employed to reduce the effects of platform vibrations on the measured and processed data.

Seismic source 108 generates at least one seismic wave in the area of interest that propagates in the area of interest and modifies some of the characteristics of assemblage of laser spots 118 illuminated on the ground of the area of interest. Seismic source 108 may generate seismic pulses in the ground by repeatedly striking the surface of the ground. The typical frequency of such strikes is 1-2 pulses per second where the strike impact duration is less than 1 millisecond (mS). Seismic source 108 may also continuously vibrate the ground. Seismic source 108 may be a controllable seismic source such as an explosive or a set of explosives, a thumper truck or a seismic vibrator (e.g., the Vibroseis). Seismic source 108 can also be implemented as any kind of hammer striking the ground which is controlled mechanically, hydraulically or electrically. Seismic source 108 can also be implemented as a high power loudspeaker. An example, of seismic source 108 may be accelerated weight seismic source model ESS200T from Gisco (USA). Seismic source may further be a synchronized phase array of seismic sources generating a directional seismic wave. Seismic source 108 may alternatively be an uncontrolled seismic source. In such a case, seismic source 108 is not considered as an element of system 100. For example, background seismic activity exists constantly in the ground of the Earth and is due to regular or irregular movement of the ground. According to the disclosed technique, shifts in the speckle patterns created by the diffusive reflection of the laser spots of laser spots assemblage 110 occur even due to the background seismic activity of the Earth. Since an assemblage of laser spots is used as well as a high speed detector, these shifts can be determined without requiring the use of an active seismic source. Therefore, in this embodiment, system 100 does not include seismic source 108. Rather, it is assumed that the shifts in the speckle patterns are due to the presence of the background seismic activity of the Earth. It is noted that seismic source 108 may include a plurality of seismic sources (not shown) which generate a relatively small number of seismic waves in the area of interest.

As mentioned above, seismic source 108 generates at least one seismic wave that propagates in the area of interest, thereby causing a shift in the speckle pattern interference of the laser spots. Imager 104 acquires images of reflection of laser beams from the surface. Specifically, imager 104 receives speckle patterns interferences of the reflections of assemblage of laser spots 118, acquires a plurality of successive images of these speckle patterns and associates each image with a respective time-tag. Imager 104 acquires these images in a defocused image plane. In other words, imager 104 acquires defocused images of the reflections of the laser beams from the surface. In the defocused plane, an angular displacement (i.e., tilt) of the surface between the acquisition of two images, results in a vertical or horizontal shift of the speckle pattern in the imaging sensor plane, and thus in the shift of corresponding speckle patterns between the two images. As such, the shift of the speckle patterns between subsequent images is related to the vibrations of the surface in general, and to the tilt vibrations of the surface in particular, and thus to the seismic activity thereof.

Imager 104 provides the acquired images of the speckle patterns to processor 106. Processor 106 processes the received images to determine the relative shift of each speckle pattern, for example, by employing optical flow techniques, or cross-correlating of sequential pairs of images of the speckle patterns (i.e., as determined according to the time-tag associated with each image). It is noted that the term 'sequential pairs of images' herein relates to two image where one was acquired at a later than the other and not necessarily to two images associated with successive respective time-tags. Processor 106 uses these shifts to produce a time signal respective of each speckle pattern. The time signal represents the tilt vibrations of each sensing point (i.e., the location of each laser spot on the ground at which the tilt vibrations are measured). Processor 106 employs the time signal (i.e., the tilt vibrations estimation) corresponding to at each sensing point to produce a seismic map of the region of interest. Processor 106 employs the seismic map to detect underground objects in the area of interest and further employs the seismic map to generate a seismic image of the area of interest. Producing a seismic map, detecting underground objects and generating a seismic image are further discussed below.

Figure 9A:
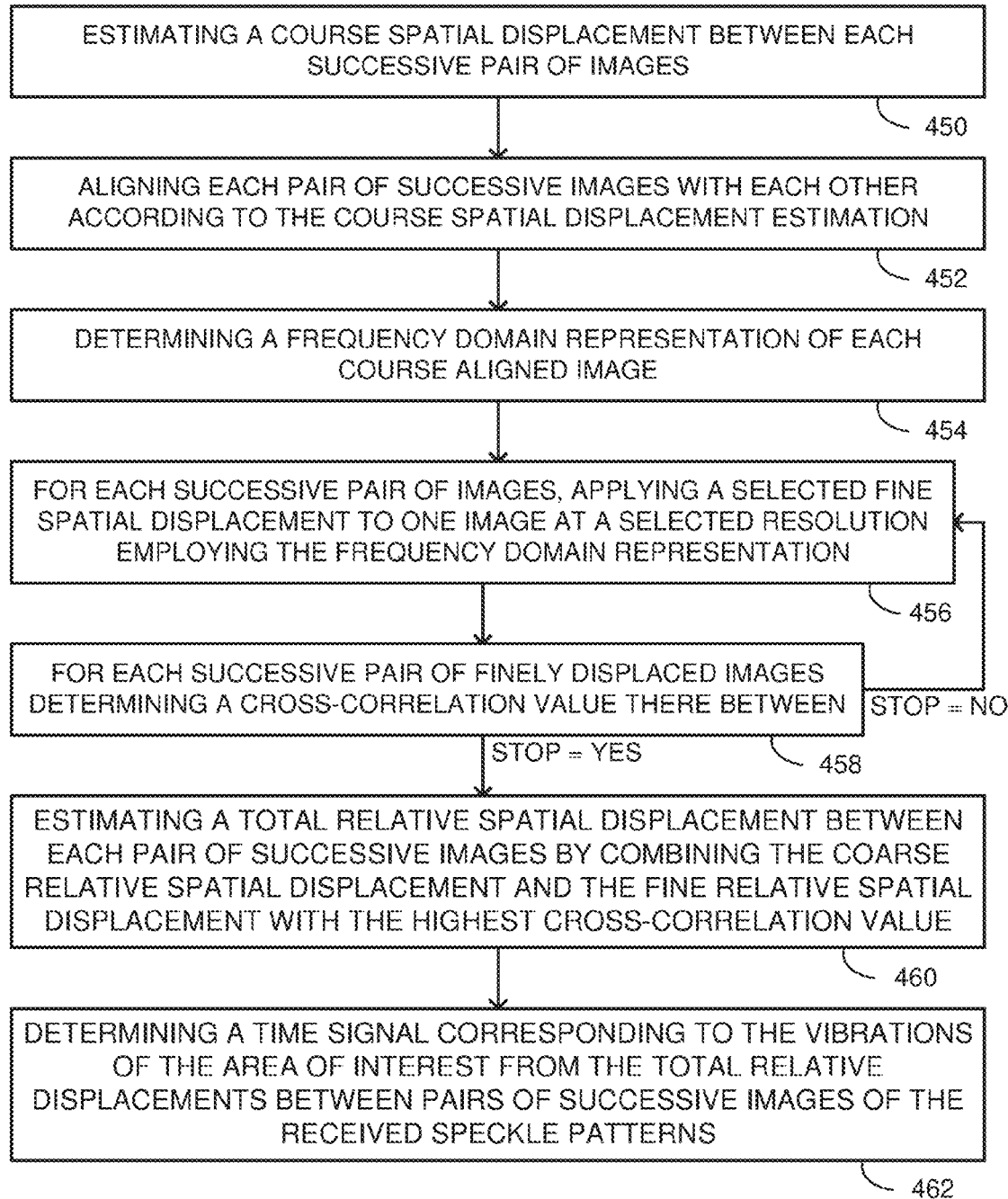
FIGS. 9A and 9B are a schematic illustration of methods for detecting the vibrations of the area of interest for optical seismic surveying, operative in accordance with a further embodiment of the disclosed technique.

The method used by processor 106 to estimate the tilt vibrations at each sensing point is further described below in conjunction with FIGS. 8, 9A and 9B.

As mentioned above, system 100 may scan the area of interest. To that end, the elevation and azimuth (may also be referred to as Pan and Tilt) of multibeam laser source 102 and imager 104 are controlled. For example, multibeam laser source 102 and imager 104 are mounted on a gimbal controlled by actuators 116. As further elaborated below, processor 106 provides actuators 116 with instructions relating the required change in the azimuth and elevation of the gimbal and thus of multibeam laser source 102 and imager 104.

Figure 2B:
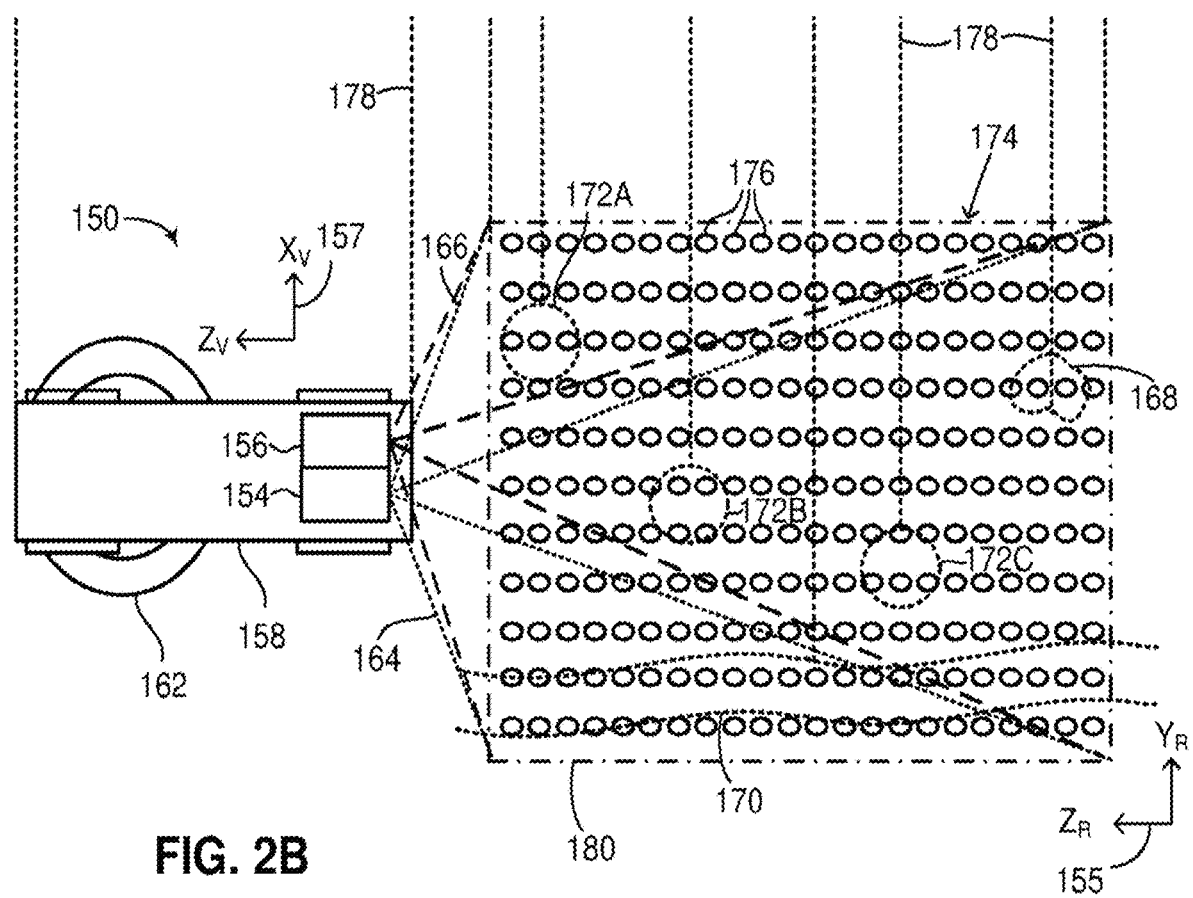
Figure 2C:
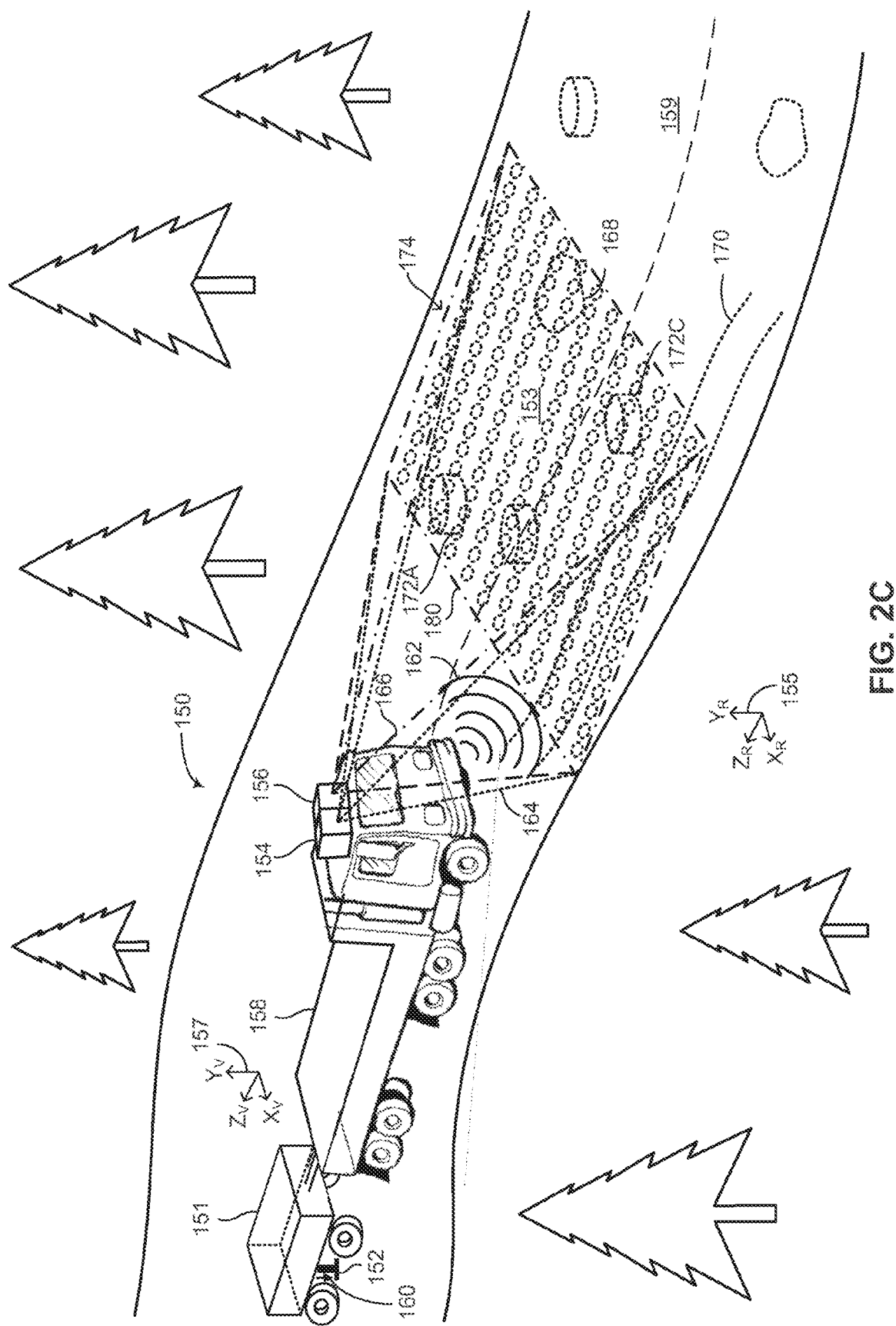

Reference is now made to FIGS. 2A, 2B and 2C, which are schematic illustration of an exemplary seismic surveying system, generally referenced 150, employed to detect and image underground objects, constructed and operative in accordance with another embodiment of the disclosed technique. FIGS. 2A-2C depicts a typical scenario in which a system according to the disclosed technique is employed. FIG. 2A is a schematic side view illustration of system 150, FIG. 2B is a schematic top view illustration of system 150 and FIG. 2C is a schematic isometric view of system 150. Equivalent elements in FIGS. 2A-2C are indicated using identical numbering. It is noted that system 150 is similar to system 100 (FIG. 1). However, for the sake of simplicity of the Figures and accompanying explanations, several elements described in conjunction with system 100 (FIG. 1) where omitted in the description of FIGS. 2A-2C. System 150 includes a seismic source 152, a multibeam laser source 154 and an imager 156. Multibeam laser source 154 and imager 156 are mounted on vehicle 158 and seismic source 152 is mounted on a cart 151 which is towed by vehicle 158. Vehicle 158 may be a thumper truck and is associated with a vehicle frame of referenced $X_V$, $Y_V$, $Z_V$ 157. Multibeam laser source 154 and imager 156 may be mounted on a controlled gimbal on vehicle 158 (e.g., on a mast attached to vehicle 158) such that multibeam laser source 154 and imager 156 may be directed toward selected azimuth and elevation directions. In FIGS. 2A-2C, seismic source 152 is depicted as being mounted on a cart 151 being towed by vehicle 158. It is noted that this is an example only, which is brought herein for explanatory purposes only. In general, seismic source 152 may be located on vehicle 158 or separated therefrom. For example, seismic source 158 may be located on a different vehicle. Physically separating seismic source 158 from multibeam laser source 154 and imager 156 reduces the mechanical coupling therebetween. Thus, the vibrations induced on multibeam laser source 154 and imager 156 by seismic source 152 are reduced relative to the vibrations induced on multibeam laser source 154 and imager 156 by seismic source 152 when seismic source is mounted on the same vehicle as multibeam laser source 154 and imager 156.

Vehicle 158 drives along a road 159. As shown in FIG. 2A-2C, ground 153 includes a plurality of underground objects such as a rock 168, an ancient wall 170 and a plurality of rocks 172A, 172B and 172C. As vehicle 158 drives along road 159, vehicle 158 actively uses seismic source 152 to generate at least one seismic wave 162 in a ground 153. Seismic wave 162 propagates in ground 153, including an instantaneous area of interest 180. Seismic source 152 substantially strikes ground 153 in the direction of an arrow 160. Multibeam laser source 154 includes at least a plurality of laser sources and a DOE. The laser sources direct the respective beams thereof toward a single common focal point where the DOE is located. The DOE is employed as a beam splitter which splits each of the laser beams to a plurality of respective beams. Thus, multibeam laser source 154 illuminates an instantaneous area of interest 180 by directing a plurality of laser beams to generate an assemblage of laser spots (not labeled in FIG. 2A). The assemblage of laser spots substantially covers the surface of instantaneous area of interest 180 as demarcated by a set of dotted lines 164. System 150 scans the area of interest with laser spot assemblage as vehicle 158 progresses along road 159. As vehicle 158 progresses along road 159, imager 156 receives speckle patterns corresponding to each laser spot in the assemblage of laser spots as demarcated by a set of dotted lines 166 and acquires a defocused image of the received speckle patterns.

With reference to FIG. 2B, the top view of system 150 shows an assemblage of laser spots 174, which includes a plurality of laser spots 176. As shown in FIG. 2B, multibeam laser source 154 simultaneously transmits a plurality of laser beams in the form of an assemblage of laser spots. Laser spots assemblage 174 substantially covers the entire surface area of instantaneous area of interest 180. A plurality of lines 178 demarcates the relative location of similar elements in FIGS. 2A and 2B. Not shown in FIGS. 2A-2C is a processor, which is coupled with seismic source 152, multibeam laser source 154 and imager 156, and receives successive images of speckle patterns, acquired by imager 156 over time, as vehicle 158 progresses along road 159. The general configuration of multibeam laser source 154 and imager 156 can be referred to as an optical geophone array which is capable of detecting the presence of seismic waves at a very high resolution and sensitivity. This in turn enables system 200 depicted in FIGS. 2A-2C to be used in real-time seismic surveying.

As seen in FIG. 2B, assemblage of laser spots 174 is formed from multibeam laser source 154, where each laser spot in assemblage of laser spots 174 is formed by a respective beam of laser light emanating from the aperture of multibeam laser source 154 and illuminating a different portion of area of interest 180. It is noted that the number of spots in laser spots assemblage 174 may be larger than the number of laser sources in multibeam laser source 154. The DOE may split each beam incident thereon to a plurality of beams. Also, when multibeam laser source 154 illuminates the ground in a grazing angle, the laser spots in laser spots assemblage 174 are not equally distant from imager 156.

Common DOE and Resolution Improvement

Figure 3A:
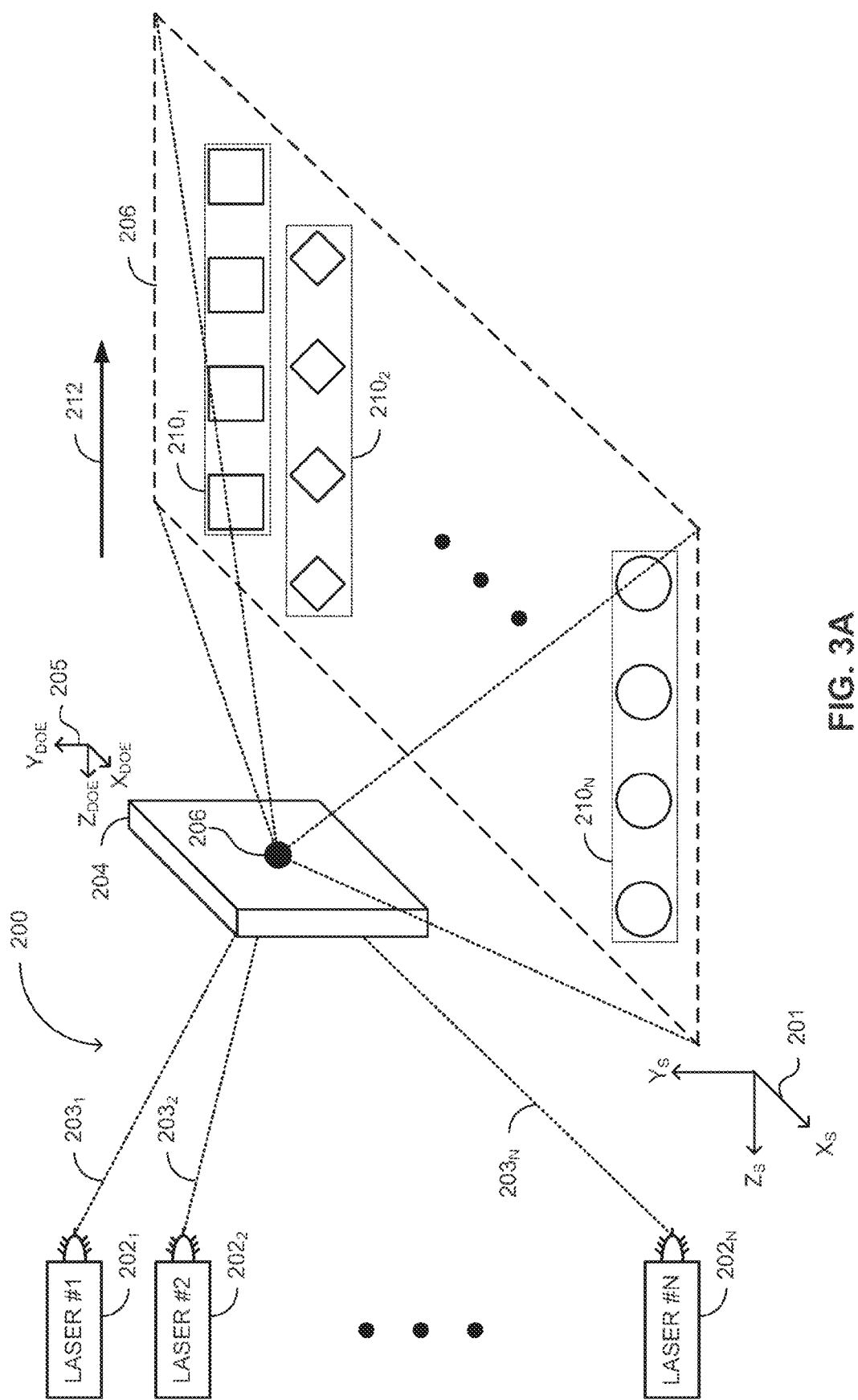

As discussed above, the required output power from a single laser source may render such a laser source impractical (e.g., due to price or availability). Therefore, a plurality of laser sources, directing the respective beams thereof at a single common focal point, may be employed instead of a single laser source. When employing a plurality of laser sources, the output power of each laser source may be lower than the required output power from the multibeam laser source. However, the combined power of all the laser sources, directing the respective beams thereof at a single common focal point, achieves the required output power from the multibeam laser source with practical laser sources. Reference is now made to FIGS. 3A, 3B and 3C. FIGS. 3A and 3B are a schematic illustration of a multibeam laser source, generally referenced 200, constructed and operative with a further embodiment of the disclosed technique. In FIGS. 3A and 3B, multibeam laser source 200 is associated with a respective source reference frame 201 ($X_S$, $Y_S$, $Z_S$) and DOE 204 is associated with respective DOE reference frame 205 ($X_{DOE}$, $Y_{DOE}$, $Z_{DOE}$). FIG. 3C is a schematic illustration of graph 220, depicting light intensity coverage of laser multibeam laser source 200 projected on the ground, during motion along the Zs axis, also in accordance with a further embodiment of the disclosed technique. Multibeam laser source 200 may be employed in a seismic surveying system according to the disclosed technique such as system 100 (FIG. 1) or system 200 (FIG. 2A-2C). Multibeam laser source 200 includes a plurality of laser sources $202_1$, $202_2$, ..., $202_N$ and a DOE 204. FIGS. 3B and 3C relate to a specific example of multibeam laser source 200 where the number of laser sources is six (i.e., laser source $202_1$, $202_2$, $202_3$, $202_4$, $202_5$, $202_6$). FIG. 3A depicts a schematic illustration of multibeam laser source 200 from an isometric view and FIG. 3B depicts a schematic illustration of multibeam laser source 200 from a top view.

Each one of laser source $202_1$, $202_2$, ..., $202_N$ directs the respective laser beam thereof $203_1$, $203_2$, ..., $203_N$ toward a single common focal point 206. DOE 204 is located at this single common focal point 206. DOE 204 is employed as a beam splitter which splits each laser beam $203_1$, $203_2$, ..., $203_N$ into a respective group of laser beams, where each group creates a respective group $210_1$, $210_2$, ..., $210_N$ of laser spots. Groups of laser spots $210_1$, $210_2$, ..., $210_N$ create assemblage of laser spots 208 in an area of interest. In FIGS. 3A and 3B, source reference frame 201 and DOE reference frame 205 are aligned with each other and DOE 206 directs a matrix of beams which exhibits, for example, a block arc shaped envelope on the ground. As a further example, DOE 206 directs a matrix of beams which exhibits round shaped envelope (i.e., which results in an elliptic shaped envelope on the ground).

As discussed above, a single laser source generating a laser beam at the required output power may render such a source impractical. Employing a plurality of laser sources $202_1, 202_2, \ldots, 202_N$ directing the respective laser beam $203_1, 203_2, \ldots, 203_N$ toward single common focal point 206 and positioning DOE 204 at single common focal point 206 enables generating a desired laser output power from multibeam laser source 204, while the individual power of each of laser sources $202_1, 202_2, \ldots, 202_N$ is lower than the required laser output power. Thus, a plurality of practical laser source may be employed to generated laser spot assemblage 208 with the required power.

Typically, multibeam laser source 200 is mounted on a vehicle (e.g., vehicle 159—FIGS. 2A-2C), progressing in a direction indicated by arrow 212 (i.e., along the Zs axis). Thus, the laser spot assemblage 208 scans an area of interest. However, as depicted in FIG. 3C, the gaps between groups of laser spots groups $210_1, 210_2, 210_3, 210_4, 210_5$ and $210_6$ create gaps $222_1, 222_2, 222_3, 222_4$ and $222_5$ in the coverage of laser spot assemblage 208 during motion along the Zs axis. These gaps $222_1, 222_2, 222_3, 222_4$ and $222_5$ limit the detection resolution (i.e., the smallest detectable object) of a seismic surveying system.

To increase the detection resolution of a system employing a multibeam laser source, such as multibeam laser source 200 (FIGS. 3A and 3B), the distance between sensing points (i.e., points which are illuminated by a laser spot and which the tilt vibrations thereat are measured), should be decreased in both the Z-axis and the X-axis of the source reference frame (e.g., source reference frame 201—FIGS. 3A and 3B). According to one alternative for increasing the detection resolution of a seismic surveying system according to the disclosed technique, the DOE is configured to output an assemblage of beams (i.e., not necessarily in matrix form) with a predetermined distribution with smaller gaps between the laser spots (i.e., relative to DOE 204 in FIGS. 3A-3C). However, the increase in the detection resolution may also be achieved with a DOE similar to DOE 204 (FIGS. 3A and 3B). To decrease the gaps between the sensing points along the X-axis, the DOE is positioned such that the DOE reference frame exhibits an axial orientation about the Z-axis relative to the source reference frame. To decrease the gaps between the sensing points along the Z-axis, the seismic surveying system scans the area of interest.

Figure 4A:
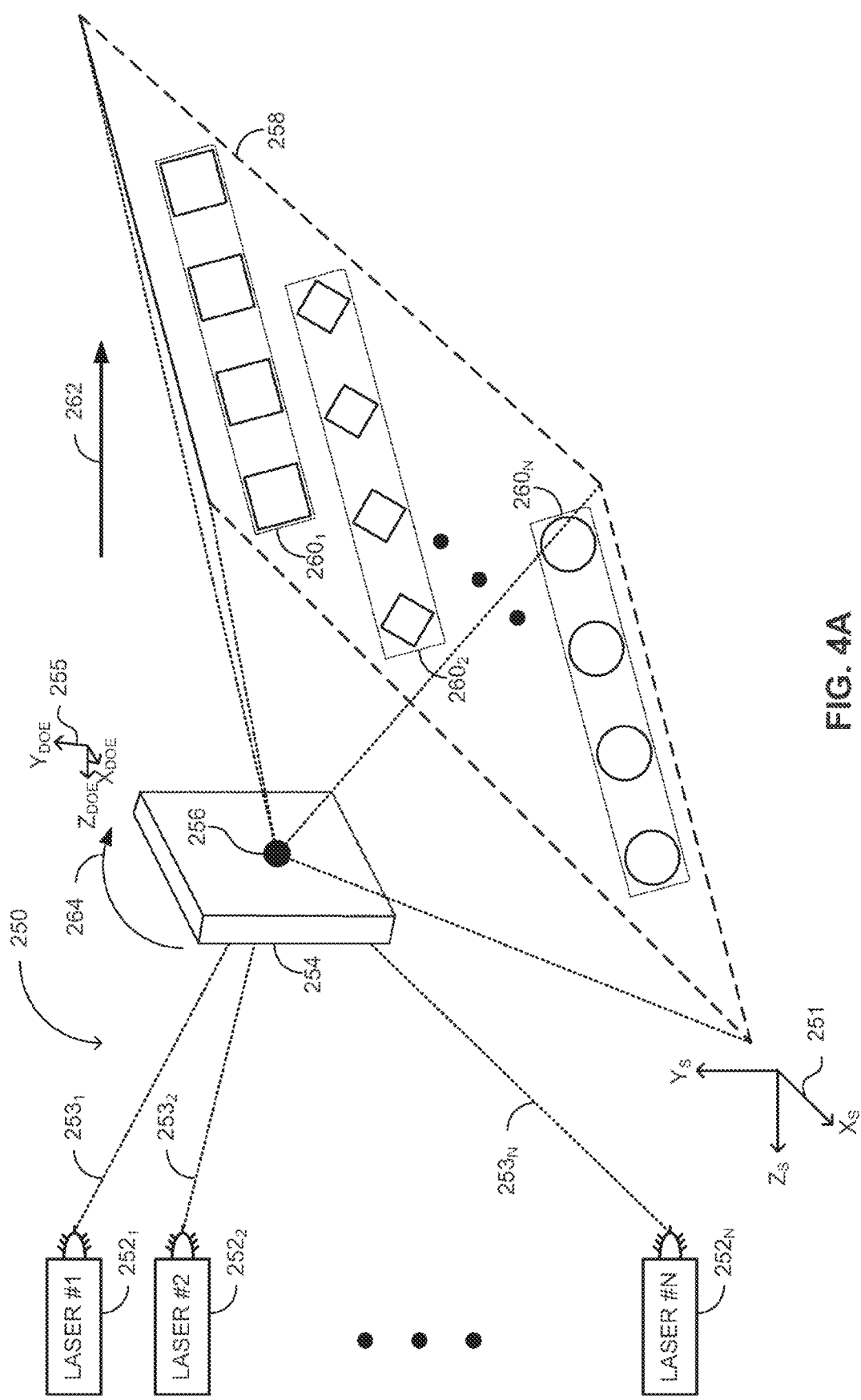
FIGS. 4A and 4B are a schematic illustration of a multibeam laser source, constructed and operative in accordance with another embodiment of the disclosed technique.
Figures 4B, 4C:
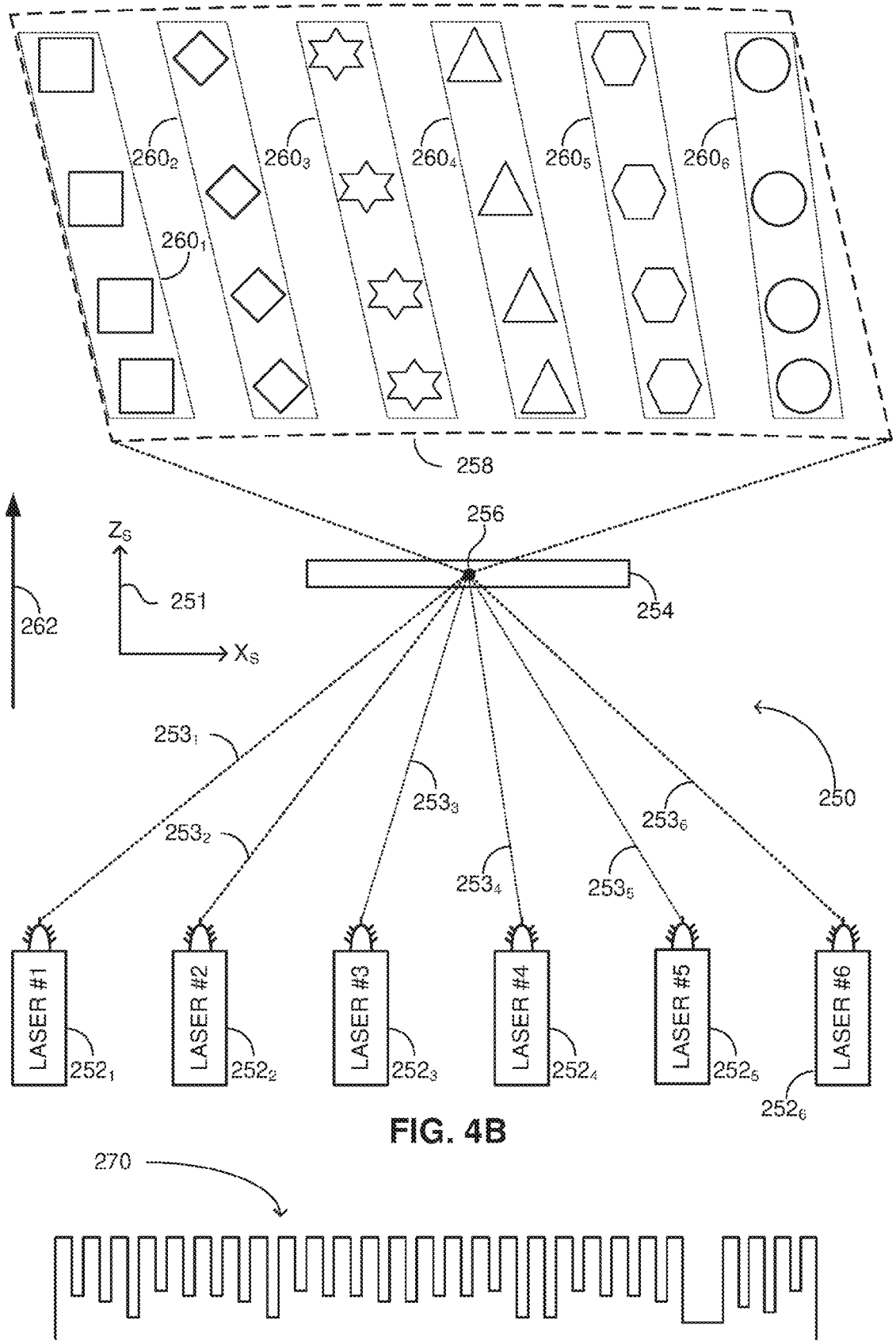
FIG. 4C is a schematic illustration of a graph depicting light intensity coverage of a laser multibeam laser source projected on ground during motion along the Zs axis, also in accordance with another embodiment of the disclosed technique.

Reference is now made to FIGS. 4A, 4B and 4C. FIGS. 4A and 4B are a schematic illustration of a multibeam laser source, generally referenced 250, constructed and operative in accordance with another embodiment of the disclosed technique. In FIGS. 4A and 4B, multibeam laser source 250 is associated with a respective source reference frame 251 ($X_S$, $Y_S$, $Z_S$) and DOE 254 is associated with respective DOE reference frame 255 ($X_{DOE}$, $Y_{DOE}$, $Z_{DOE}$). DOE reference frame 255 exhibits an axial orientation about the Z axis relative to source reference frame 255. FIG. 4C is a schematic illustration of graph 270, depicting light intensity coverage of laser multibeam laser source 250 projected on the ground, during motion along the Zs axis, also in accordance with another embodiment of the disclosed technique. Multibeam laser source 250 may be employed in a seismic surveying system according to the disclosed technique such as system 100 (FIG. 1) or system 200 (FIG. 2A-2C).

Multibeam laser source 250 includes a plurality of laser sources $252_1, 252_2, \ldots, 252_N$ and a DOE 254. FIGS. 4B and 4C relate to a specific example of multibeam laser source 250, where the number of laser sources is six (i.e., laser source $252_1, 252_2, 252_3, 252_4, 252_5, 252_6$). FIG. 4A depicts a schematic illustration of multibeam laser source 250 from an isometric view and FIG. 4B depicts a schematic illustration of multibeam laser source 250 from a top view. According to one example, in system 250 DOE reference frame 255 exhibits an axial orientation about the Z-axis relative to source reference frame 255 relative to the DOE reference frame 205 (FIG. 3A). Consequently, DOE 254 directs an assemblage of beams which exhibits a twisted envelope relative to the envelope of the beams at the output of DOE 204 (FIG. 3A). As a result of the axial orientation of DOE 254, and with reference to FIG. 4C, the gaps in light intensity coverage graph 270 of laser multibeam laser source 250, along the X-axis, during motion along the Zs axis, are substantially smaller than gaps $220_1$-$220_5$ (FIG. 3C). As such, the distance between sensing points along the X-axis is also smaller. According to another alternative, the phase pattern of DOE 254 may be skewed relative to the phase pattern of DOE 204 such that DOE 254 directs an assemblage of beams which exhibits an arc shaped envelope. For example, the phase pattern of DOE 254 may be configured to direct an assemblage of beams such that the laser spots in the resulting laser spot assemblage shall be randomly or pseudo randomly spread on the instantaneous area of interest.

Similar to system 200 (FIGS. 3A and 3B), system 250 is typically mounted on a vehicle (e.g., vehicle 159—FIGS. 2A-2C), progressing in a direction indicated by arrow 262. Thus, the laser spot assemblage 258 scans an area of interest. To decrease the gaps between the sensing points along the Z-axis, the scanning scheme is controlled such that the instantaneous areas of interest exhibit overlap there between. The overlap is controlled such that the distance along the Z-axis, between two sensing points illuminated by the same beam (i.e., in different times) is smaller than the smallest distance between two different sensing points illuminated by different beams. Thus, the distance between sensing points along the Z-axis is decreased. Due to this overlap, gaps between seismic sensing points are smaller than the stationary gaps between the sensing points (i.e., when no scanning is performed). These smaller gaps increase the detection resolution of the seismic surveying system of the disclosed technique. Accordingly, the combination of the rotation of DOE 254, and the scanning of the area of interest, results in the increase of the detection resolution of a seismic surveying system of the disclosed technique.

Similar to laser sources $202_1, 202_2, \ldots, 202_N$ (FIGS. 3A and 3B), each one of laser source $252_1, 252_2, \ldots, 252_N$ also directs the respective laser beam thereof $253_1, 253_2, \ldots, 253_N$ toward a single common focal point 256. DOE 254 is located at this single common focal point 256. DOE 254 is employed as a beam splitter, which splits each one of laser beams $253_1, 253_2, \ldots, 253_N$, into a respective group of laser beams, where each group of laser beams creates a respective group $260_1, 260_2, \ldots, 260_N$ of laser spots. Groups of laser spots $260_1, 260_2, \ldots, 260_N$ create an assemblage of laser spots 258 in an area of interest.

As discussed above, a single laser source generating a laser beam at the required output power may render such a source impractical. Employing a plurality of laser sources $252_1, 252_2, \ldots, 252_N$ directing the respective laser beam $253_1, 253_2, \ldots, 253_N$ toward single common focal point 256 and positioning DOE 254 at single common focal point 256 enables generating a desired laser output power (i.e., output from DOE 256), while the individual power of each of laser sources $252_1, 252_2, \ldots, 252_N$ is lower than the required laser output power. Thus, a plurality of practical laser source may be employed to generated laser spot assemblage 256 with the required power.

In the examples brought forth hereinabove in FIGS. 3A, 3B, 4A, and 4B, the multibeam laser source was depicted as including a plurality of laser source arranged in a linear array. However, in general, the plurality of laser sources in a multibeam laser source of the disclosed technique may be arranged in a two dimensional array as well. Also, in the examples brought forth hereinabove, the DOE was depicted as splitting each source beam into a linear array of laser beams. It is noted that the DOE may split each laser source beam into a two dimensional array of laser beams. The laser beams output from the DOE may be interlaced. Alternative, each source beam may be slit such that the laser beams originating therefrom illuminate a different section of the instantaneous area of interest.

Figure 5A:
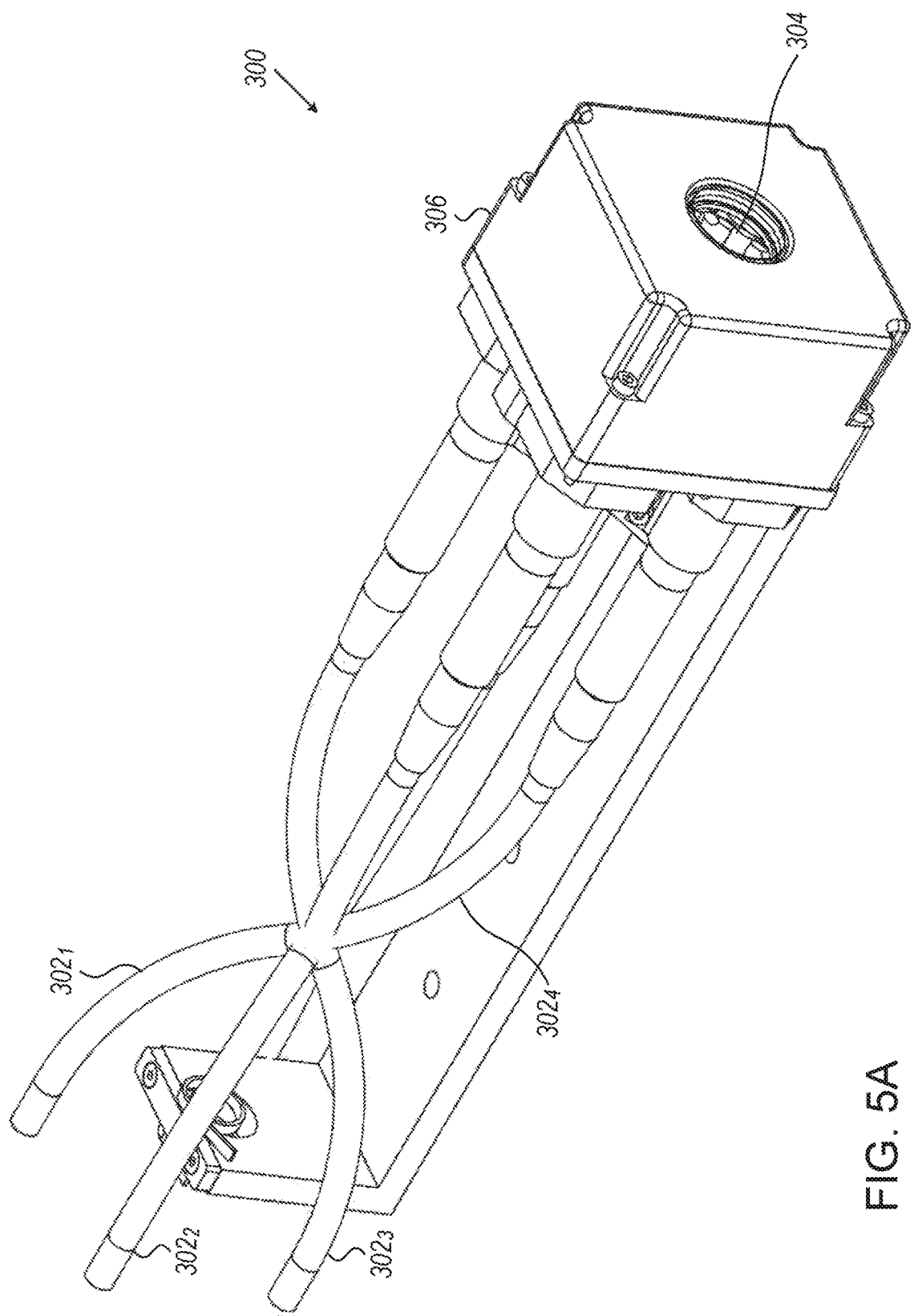
FIGS. 5A and 5B are schematic illustrations of an exemplary implementation of a multibeam laser source, constructed and operative with a further embodiment of the disclosed technique.
Figure 5B:
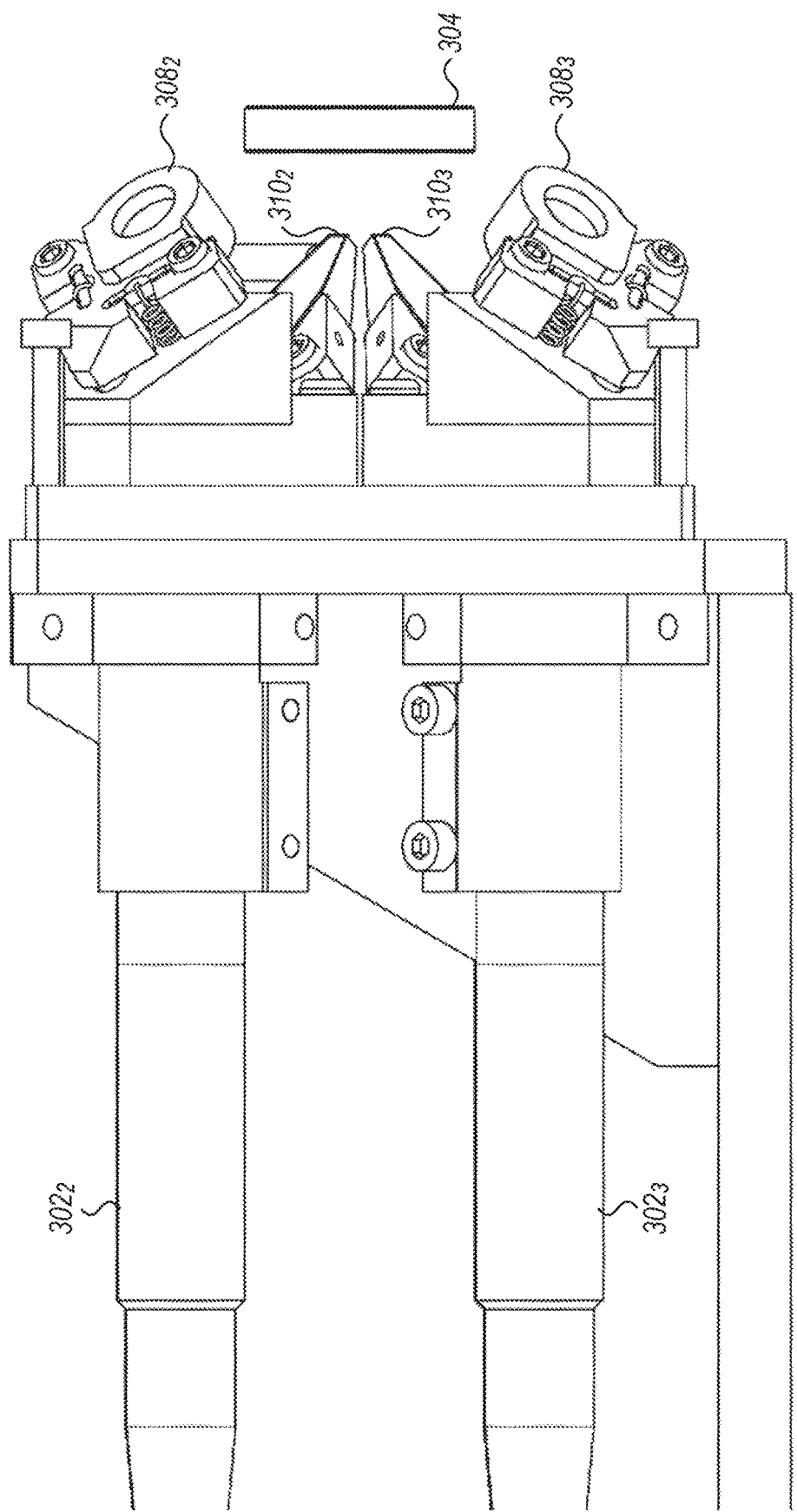

Reference is now made to FIGS. 5A and 5B which are schematic illustrations of an exemplary implementation of a multibeam laser source, generally referenced 300, constructed and operative with a further embodiment of the disclosed technique. FIG. 5A is an isometric view of multibeam laser source 300 and FIG. 5B is a side view of multibeam laser source 300 with support cover 306 removed. Exemplary multibeam laser source 300 includes four laser sources $302_1$, $302_2$, $302_3$ and $302_4$ and a DOE 304 located on the outer surface of a support cover 306. Laser sources $302_1$, $302_2$, $302_3$ and $302_4$ direct the respective light beams toward a single common focal point at which DOE 304 is located. Laser sources $302_1$, $302_2$, $302_3$ and $302_4$ direct the respective light beams toward a single common focal point via respective mirrors. For example, with reference to FIG. 5B, laser source $302_2$ directs the respective beam thereof toward the single common focal point via mirrors $308_2$ and $310_2$. Laser source $302_3$ directs the respective beam thereof toward the single common focal point via mirrors $308_3$ and $310_3$. DOE 304 may be rotated as explained above in conjunction with FIGS. 4A-4C to increase detection resolution. In multibeam laser source 300, the laser sources $302_1$, $302_2$, $302_3$ and $302_4$ are arranged in a two dimensional configuration. Furthermore, as mentioned above, DOE 304 may split each beam into a two dimensional assemblage of beams.

FOV Compression

Figure 6A:
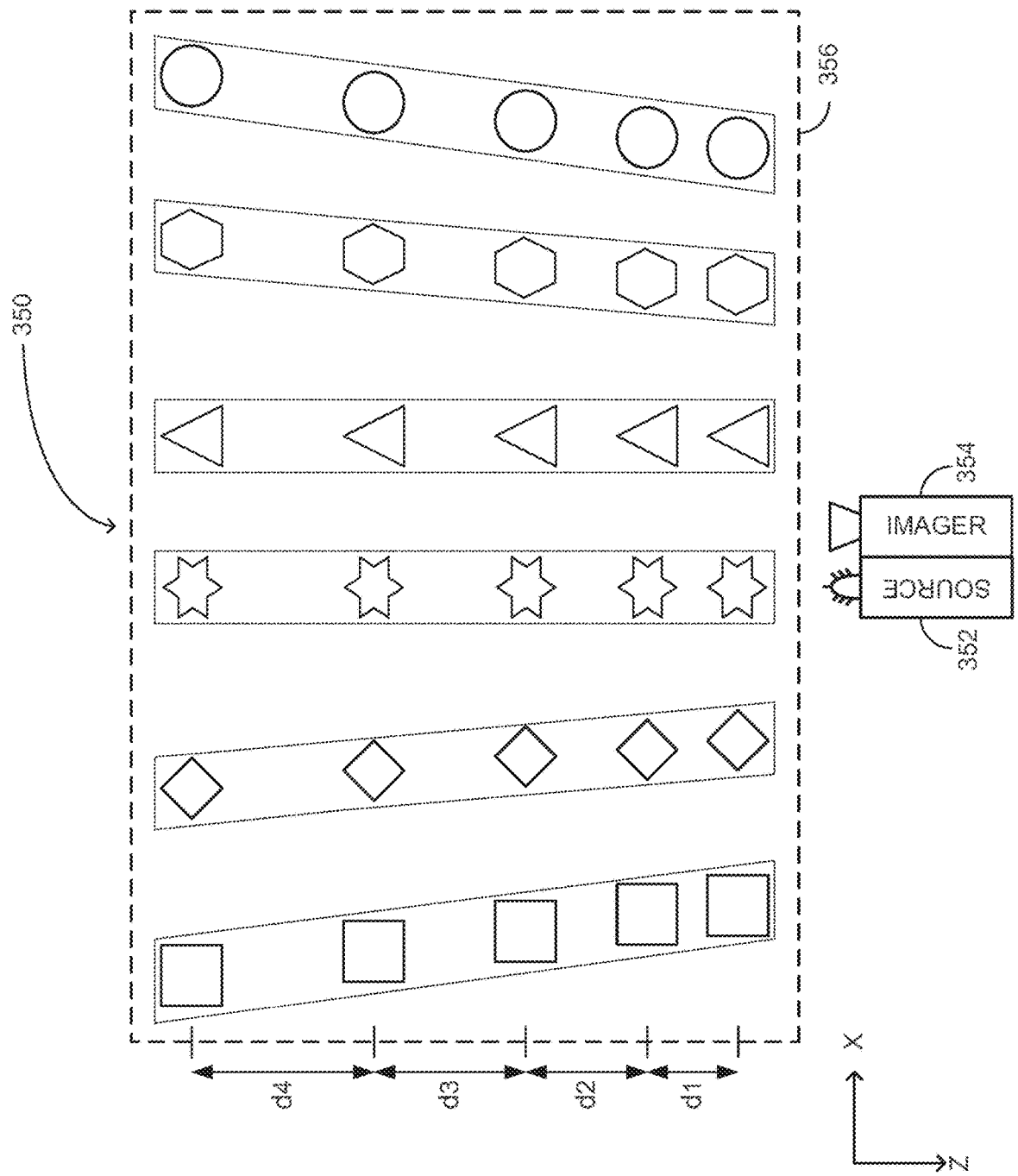
FIG. 6A, which is a schematic illustration of a laser spot assemblage, in accordance with another embodiment of the disclosed technique.

In the scenarios depicted in FIGS. 2A-2C, 3A, 3B, 4A and 4B, a seismic surveying system according to the disclosed technique, projects an assemblage of laser spots onto the ground, where a grazing angle is created between the ground surface and the incident beams. Such a grazing angle deforms the matrix of laser beams output from the multibeam laser source such that an assemblage of laser spots is created on the ground. Because of the grazing angle, the envelope of such an assemblage of laser spot may exhibit the shape of a trapezoid. Reference is now made to FIG. 6A, which is a schematic illustration of a laser spot assemblage 350, in accordance with another embodiment of the disclosed technique. Laser spot assemblage 350 is projected by a multibeam laser source 352, on an area 356. Because of the grazing angle, the envelope of laser spot assemblage 350 exhibits the shape of a trapezoid. Also, because of the grazing angle, the distance between rows of laser spots assemblage 350 increases as the distance from the multibeam laser source increases. As depicted in FIG. 6A, laser spot assemblage 350 includes five rows of laser spots. The distance between the first row and the second row is denoted 'd1'. The distance between the second row and the third row is denoted 'd2'. The distance between the third row and the fourth row is denoted 'd3' and the distance between the fourth row and the fifth row is denoted 'd4'. Because of the grazing angle, d4 is larger than d3, d3 is larger than d2 and d2 is larger than d1 (i.e., d4>d3>d2>d1). This increase of distance between the rows of laser spots limits the detection resolution of a seismic surveying system according to the disclosed technique.

To improve the detection resolution, a system according to the disclosed technique, employs asymmetric optics, further explained below, which reduces the Field Of View (FOV) of the imager, at least in the viewing (i.e., the Z axis in FIGS. 6A and 6B). Reducing the FOV of the imager is also referred to herein as "FOV compression". FOV compression enables reducing the distance between the rows of laser spots thereby increasing the detection resolution. Reference is now made to FIG. 6B, which is a schematic illustration of a laser spot assemblage 358, also in accordance with another embodiment of the disclosed technique. Laser spot assemblage 358 is projected by a multibeam laser source 360, on a detector coverage area 364 of an imager 352. Similar to as described in conjunction with FIG. 6A, because of the grazing angle, the envelope of laser spot assemblage 358 exhibits the shape of a trapezoid. However, in FIG. 6B, the FOV in the viewing direction (i.e., the Z axis) is reduced relative to the FOV in FIG. 6A, thus coverage area 364 is shorter along the Z axis than coverage area 356. Thus, the distance between the rows of laser spots in laser spot assemblage 358 may be reduced relative to the distance between the rows of laser spots in laser spot assemblage 350 (FIG. 6A), for example, by employing an DOE with a corresponding phase pattern, which splits the laser beam or beams propagating there through in a plurality of corresponding angles. It is noted that according to the disclosed technique, the lasers beam distribution angles (i.e., the angle between the left most column of laser spots to the right most column and between the bottom row of laser spots to the top row) is related to the FOV of the imager employed. In the example brought forth in FIG. 6B, the distances between the rows of laser spot assemblage 358 where reduced such that these distances are substantially smaller than the distances in FIG. 6A. The smaller distance between the spots increases the resolution. In general the FOV compression factor is determined by the application being implemented.

Figure 7D:
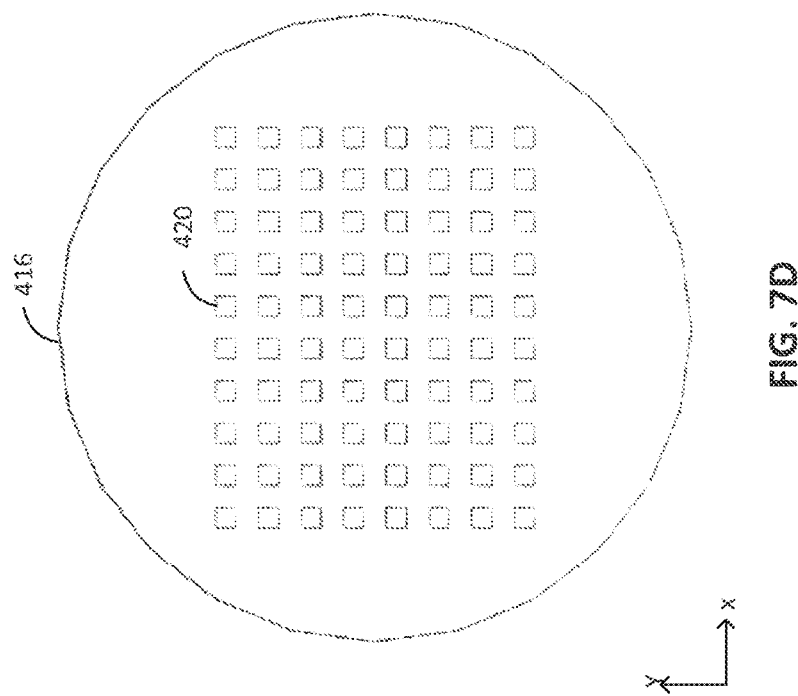
FIGS. 7C and 7D are schematic illustration of elements within optical arrangement 400 also in accordance with a further embodiment of the disclosed technique.
Figure 7C:
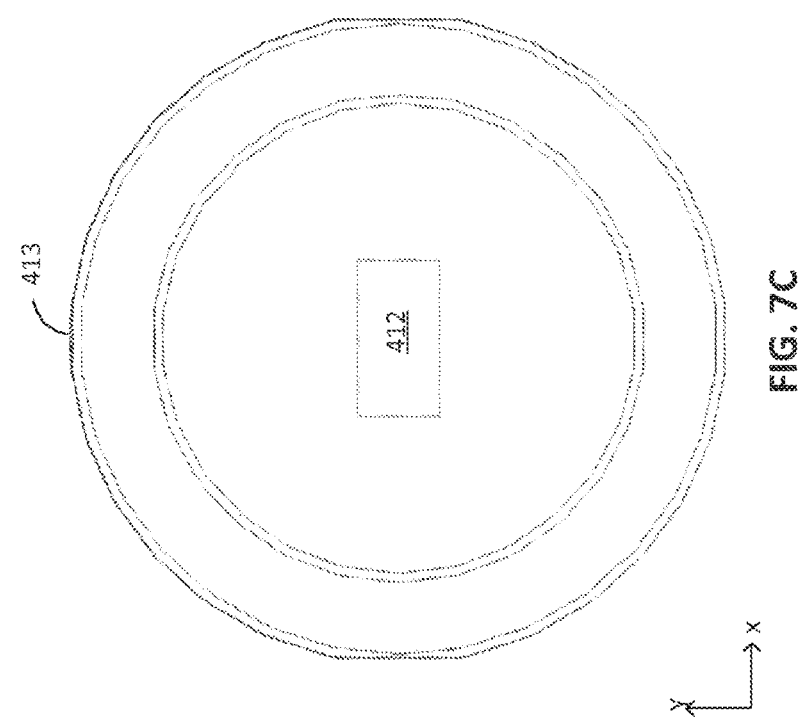

As mentioned above, reducing the FOV, at least in the viewing direction is may be achieved by employing asymmetric optics. Reference is now made to FIGS. 7A, 7B, 7C and 7D. FIGS. 7A and 7B are a schematic illustration of an optical arrangement, generally referenced 400, employing asymmetric optics for FOV compression constructed and operative in accordance with a further embodiment of the disclosed technique. FIG. 7A is a side view of optical arrangement 400 and FIG. 7B is a top view of optical arrangement 400. FIGS. 7C and 7D are schematic illustration of elements within optical arrangement 400 also in accordance with a further embodiment of the disclosed technique.

Optical arrangement 400 includes an objective section 402 and an eye-piece section 404. Objective section 402 includes objective lenses. Two of these objective lenses are cylindrical lenses 406 and 408, where the axes of these cylindrical lenses are oriented in the same direction (e.g., the X axis). Eye-piece section 404 includes eye-piece lenses. Eye piece section 404 includes a cylindrical lens 410 and an imager sensor 418. Eye piece section 404 further incudes a rectangular aperture 412, a narrow pass filter 414, and apertures matrix 416. Rectangular aperture 412 is located in a rectangular aperture frame 413. Narrow pass filter 414 is placed at a position where the angle between the lights rays passing through optical arrangement 400 and the optical axis of optical arrangement 400 is minimal (i.e., minimal divergence. The wider the angle between the light rays, the wider (i.e., spatially) narrow pass filter 414 needs to be. Cylindrical lenses 406, 408 and 410 exhibit different focal lengths in the horizontal and vertical axes. In other words, the focal length of the lens along the horizontal axis is different from the focal length of the lens along the axis. Thus, the FOV is reduced along one axis relative to the FOV in the other axis. Asymmetric optical arrangement 400 reduced the FOV in the Y axis by a predetermined factor (e.g., by a factor of 2, by a factor of 4) relative to a similar symmetric optical arrangement. Also, the focal length of optical arrangement 400 is selected such that in the selected defocus plane the size of the speckles is equalized. Furthermore, optical arrangement 400 is a telecentric optical arrangement. Telecentric optics alleviates the perspective error characteristic of conventional optics. Thus the image features remain substantially similar with changes in the relative position between the object and imaging optics. In a system according to the disclosed technique, the telecentric optics results in the Circle Of Confusion (COC) of the speckle pattern remaining at the same position in the sensor plane regardless of the defocus level.

One of the drawbacks of known in the art speckle imaging techniques is that the speckle spots exhibit a round or cylindrical shape relative to the f-number of the objective optics and thus each speckle pattern "occupies" a group of pixels on the imaging sensor. As a result, when operating in large defocus, adjacent speckle patterns may overlap one with the other. This overlap hinders the detection of speckle shift and limits the level of defocus (i.e., the distance between the imaging sensor and the focus plane) of optical assembly 400 as well as the detection resolution of the system. To alleviate this drawback, optical assembly 400 employs a rectangular aperture 412. This results in speckle spots which exhibit rectangular or square shapes. Consequently, the defocus level can be maximized without adjacent speckle spots overlapping with each other. It is noted that the geometric characteristics (e.g., the height, the width and the ratio there between) of the rectangular aperture are derived from the f-number at each axis of the lenses of the objective optics.

A seismic surveying system according to the disclosed technique may operate in daylight conditions. Such conditions may result in interferences (e.g., background light or sun light that causes quantum noise and inhomogeneous background) in the acquired image. These interferences hinder the detection of the speckle patterns in the acquired images. Therefore, as mentioned above, optical arrangement includes a narrow pass filter 414. The pass band of narrow pass filter 414 is matched to the frequency band of the laser or lasers employed by multibeam laser source. Accordingly, narrow pass filter 414 filters the light of frequencies outside the passband thereof, thereby reducing the interference resulting from operating in daylight conditions.

To further reduce interferences resulting from operating in daylight conditions, optical assembly 400 further includes an apertures matrix 416. Apertures matrix 416 includes a matrix of rectangular or square apertures, arranges according to the assemblage of laser spots output from the multibeam lase source, where the number of apertures equals the number of laser beams, output from the multibeam laser source. The size of each aperture, such as aperture 418, is matched to the size of each beam in the focus plane. Apertures matrix 416 operates as a spatial filter that blocks light which is not located in the path of the laser beams from reaching the imaging sensor, thus further reducing interferences (e.g., high order interferences created by the DOE). It is noted that apertures matrix 416 may replace rectangular aperture 412 to generate speckle spots which exhibit rectangular or square shapes. However, due to implementation consideration, both apertures matrix 416 and rectangular aperture 412 may be employed.

As mentioned above, each speckle pattern "occupies" a group of pixels on the imaging sensor. This in turn limits the detection resolution of a seismic surveying system according to the disclosed technique. To increase the detection resolution of the a seismic surveying system the system may employ time multiplexing and/or wavelength multiplexing of the laser beams being output from the multibeam laser source.

The detection resolution of a seismic surveying system employing the same imaging sensor may be increased by employing time multiplexing. Accordingly, the laser sources in the multibeam laser source are divided into a plurality of groups of laser sources, where each group includes at least one laser source. Each group of laser sources directs the respective laser beams thereof toward the DOE. Since the angle of impingement of the beam from each laser source on the DOE is different, the beam from each laser source results in a different group of laser beams emitted from the DOE toward the instantaneous area of interest. Consequently, each group of laser sources results in a different group of laser spots on the instantaneous area of interest. By sequentially activating each group of laser sources, and synchronously therewith acquiring images of the speckle patterns respective of each of the laser spots, the number of different laser spots at respective different locations in the instantaneous area of interest is increased and thus the detection resolution with the same imaging sensor. In such a case, the pair of sequential images employed for detection should be from the same time batch of acquired images.

Additionally or alternatively, a seismic surveying system of the disclosed technique, wavelength multiplexing of the laser beams being output from the multibeam laser source. Accordingly, the laser sources in the multibeam laser source are divided into a plurality of groups of laser sources, where each group includes at least one laser source and each group is associated with a respective unique wavelength (i.e., the laser source in each group emit laser beams at the same respective wavelength). Each group of laser sources directs the respective laser beams thereof toward the DOE. Since the angle of impingement of each laser source on the DOE is different, the beam from each laser source results in a different group of laser beams emitted from the DOE toward the instantaneous area of interest. Consequently, each group of laser sources results in a different group of laser spots on the instantaneous area of interest, each group being associated with the respective wavelength. By employing a plurality of imagers, where each imager is sensitive at a respective wavelength corresponding to a wavelength of a group of laser sources, the number of different laser spots at respective different locations in the instantaneous area of interest is increased and thus the detection resolution with the same imaging sensor. As described above, the sensitivity of each imager to a respective wavelength is achieved by a narrow pass filter such as narrow pass filter 414, matched to the frequency band of the respective group of laser sources.

In a seismic surveying system according to the disclosed technique, such as seismic surveying system 100 (FIG. 1), seismic surveying system 150 (FIGS. 2A-2C), seismic surveying system 200 (FIGS. 3A-3B) or seismic surveying system 250 (FIGS. 4A-4B) the multibeam laser source may emit pulses of laser beams. The imager is synchronized to the laser pulses (i.e., integration occurs only when light is expected to impinge on the imaging sensor), thus enabling to reduce the integration time and the quantum noise originating from the sun light. This also reduces the blur resulting from detection in motion.

Seismic Vibrations Detection

When a laser beam impinges on a surface, that beam is diffusively reflected from the surface. The diffusive reflection of different portions of the light beam results in a random shift of the phases of the portions of the corresponding light waves. Consequently, waves (i.e., the electromagnetic waves) corresponding to the diffusively reflected portions of the light beam, constructively and destructively interfere with each other. This interference results in a light distribution with varying intensity. These random variations in the intensity generate a speckle pattern for each light beam on the detector plane. The speckle pattern varies with tilt (i.e., angular displacement) of the surface. As described above, an imager acquires images of reflection of laser beams from the surface. Specifically, the imager acquires these images in a defocused image plane. In other words, the image acquires defocused images of the reflections of the laser beams from the surface. In the defocused plane, an angular displacement of the surface (e.g., due to the propagating seismic waves) results in a lateral or longitudinal shift of the speckle pattern and in the shift of the speckle pattern between subsequent images. As such, the shift of the speckle patterns between subsequent images is related to the tilt vibrations of the surface and thus to the seismic activity thereof.

Reference is now made to FIG. 8, which is a schematic of a method for seismic surveying, operative in accordance with another embodiment of the disclosed technique. In procedure 430 a plurality of laser beams are directed toward an instantaneous area of interest. The laser beams produce an assemblage of laser spots on an instantaneous area of interest. With reference to FIG. 1, multibeam laser source 102 directs a plurality of laser beams toward an instantaneous area of interest, producing an assemblage of laser spots 118 on an instantaneous area of interest In procedure 432, a plurality of defocused images of speckle patterns are acquired. Each image is associated with a respective time-tag. The speckle patterns are produced by diffused reflections of the laser spots from the instantaneous area of interest. Each speckle pattern corresponds to a respective laser spot and thus to a respective sensing point in the instantaneous area of interest. With reference to FIG. 1, imager 104 acquires a plurality of defocused images of speckle patterns where each image is associated with a respective time-tag.

In procedure 434, the relative displacement between corresponding speckle patterns in pairs of sequential images of the received speckle patterns is determined. The relative displacement between corresponding speckle patterns in pairs of successive images is determined, for example by:
- estimating a course spatial displacement between each pair of sequential images;
- aligning each of the pairs of sequential images with each other according to the course spatial displacement estimation;
- determining a fine spatial displacement between each of the pairs of sequential images;
- estimating a total relative spatial displacement between each of the pairs of sequential images by combining said estimated coarse relative spatial displacement and said determined fine relative spatial displacement with the highest cross-correlation value.

With reference to FIG. 1, processor 106 determines the relative displacement between corresponding speckle patterns in pairs of sequential images of the received speckle patterns.

In procedure 436, a respective time signal for each sensing point, representing the tilt vibrations thereat, is determined from the total relative displacements between pairs of speckles patterns respective of each sensing point. With reference to FIG. 1, processor 106 determines a respective time signal for each sensing point, representing the tilt vibrations thereat from the total relative displacements between pairs of speckles patterns respective of each sensing point.

It is noted that procedures 430, 432, 434 and 436 are repeated for each instantaneous area of interest until the area of interest has been scanned.

In procedure 438, a seismic map of the area of interest is produced from the time signals corresponding to each sensing point. With reference to FIG. 1, processor 106 produces a seismic map of the area of interest is produced from the time signals corresponding to each sensing point.

In procedure 440, objects are detected in the area of interest from the seismic map. With referenced to FIG. 1, processor 106 detects objects in the area of interest from the seismic map. Generating a seismic map and detecting objects therefrom is further discussed below. With reference to FIG. 1, processor 106 detects objects in the area of interest In procedure 442, a seismic image of the area of interest is generated. A seismic image is an image or a map of the area of interest with symbols representing the detected objects superimposed thereon at the corresponding locations With reference to FIG. 1, processor 106 generates a seismic image of the area of interest.

It is noted that 2D lateral velocity, for example, of the ground (e.g., has measured by known in the art geophones) and the 2D tilt vibrations measured, according to the disclosed technique by the shift of speckle patterns are related by a mathematical relation as follow:

$$S \propto \nabla \times \vec{u} \tag{1}$$

where S is the speckle pattern shift, $\vec{u}$ is the 2D velocity field on the surface and $\nabla \times$ is the Curl vector operator.

When detecting the vibrations of the ground caused by seismic source, and specifically when detecting tilt vibrations, it may be required to detect the shift of the speckle patterns between subsequent images at a higher resolution than that of the imaging sensor in the imager. In other words, the displacement of the speckle pattern between subsequent images may need to be detected in sub-pixel resolution. Reference is now made to FIGS. 9A and 9B, which are a schematic illustration of methods for detecting the tilt vibrations of the area of interest for optical seismic surveying, operative in accordance with a further embodiment of the disclosed technique. FIG. 9B is a schematic illustration of a method for estimating the coarse spatial displacement between pairs of sequential images. In procedure 450, a course spatial displacement is estimated between each pair of sequential images. The coarse spatial displacement may be estimated in sub-pixel level. In general, estimating spatial displacement between pairs of images is achieved by optical flow techniques. Such methods include phase correlation, block-based methods (e.g., minimizing sum of squared differences, sum of absolute differences or maximizing normalized cross-correlation), differential methods based on partial derivatives of the image signal and/or the flow field and higher-order partial derivatives and discrete optimization methods. An example of estimating a coarse spatial displacement between a pair of sequential images is brought herein in conjunction with FIG. 8.

In procedure 452, each pair of sequential images is aligned with each other according to the coarse relative spatial displacement estimation. With reference to FIG. 1, processor 106 aligns each pair of sequential images with each other according to the coarse relative spatial displacement estimation.

In procedure 454, a frequency domain representation of each coarsely aligned image is determined. The frequency domain representation of an image is determined by employing the Fourier Transform and specifically the Discrete Fourier Transform (e.g., by employing the Fast Fourier Transform algorithm). With reference to FIG. 1, processor 106 determines a frequency domain representation of each coarsely aligned image.

In procedure 456, for each pair of coarsely aligned sequential images, a selected fine relative spatial displacement is applied there between at a selected resolution employing the frequency domain representation. This selected resolution is generally at a sub-pixel level (e.g., a fifth of a pixel, a tenth of a pixel). One example of applying a selected fine relative spatial displacement between a pair of sequential images at a selected resolution is by applying a phase shift to one frequency representation of the images, where the phase shift corresponds to the selected fine relative spatial displacement at the selected resolution. A phase shift in the frequency domain corresponds to a spatial shift in the spatial domain. A phase shift in the frequency domain is achieved, for example, by multiplying each element in the frequency domain representation by a selected complex phase shift coefficient, as follows:

$$I_{shifted}(\omega_x,\omega_y)=I_{original}(\omega_x,\omega_y)e^{-j(\omega_x\Delta x+\omega_y\Delta y)} \quad (2)$$

where $I_{original}$ corresponds to the frequency representation of the original image, $I_{shifted}$ corresponds to the frequency representation of the shifted image, $\omega_x$ corresponds to the x frequency axis, $\omega_y$ corresponds to the y frequency axis, $\Delta x$ corresponds to the required spatial displacement in the x axis and $\Delta y$ corresponds to the required spatial displacement in the y axis. With reference to FIG. 1, processor 106 applies a selected fine relative spatial displacement between each pair of coarsely aligned sequential images, at a selected resolution.

In procedure 458, for each pair of finely displaced sequential images, a cross-correlation value is determined there between. The cross-correlation value may be determined in the frequency domain or in the spatial domain. The method returns to procedure 458 when a stop criterion is not met, designated by 'STOP=NO' in FIG. 8. The method proceeds to procedure 462 when the stop criterion is met, designated by 'STOP=YES' in FIG. 8. The stop criterion is for example a predetermined number of iteration. The stop criterion may also be, for example, when the fine cross-correlation value exceeds a predetermined threshold. The stop criterion may also be when, for example, the earliest of the above mentioned criteria occur. With reference to FIG. 1, processor 106 determines a cross-correlation value for each pair of finely displaced sequential images.

In procedure 460, a total relative spatial displacement is estimated between each pair of sequential images. The total relative displacement between a pair of sequential images is estimated by combining the coarse relative spatial displacement (determined in procedure 450) and the fine relative spatial displacement with the highest cross-correlation value (determined in procedures 456 and 458). With reference to FIG. 1, processor 106 estimates a total relative spatial displacement between each pair of sequential images.

In procedure 462, a time signal corresponding to the tilt vibrations of the area of interest is determined from the total relative displacements between pairs of sequential images of the received speckle patterns. As mentioned above, shift of the speckle patterns between subsequent images is related to the tilt vibrations of the surface and thus to the seismic activity thereof. A time signal derived from the displacement displacements between pairs of sequential images of the received speckle patterns is related to the tilt vibrations of the ground surface. With reference to FIG. 1, processor 106 determines a time signal corresponding to the tilt vibrations of the ground from the total relative displacements between pairs of sequential images of the received speckle patterns.

Figure 9B:
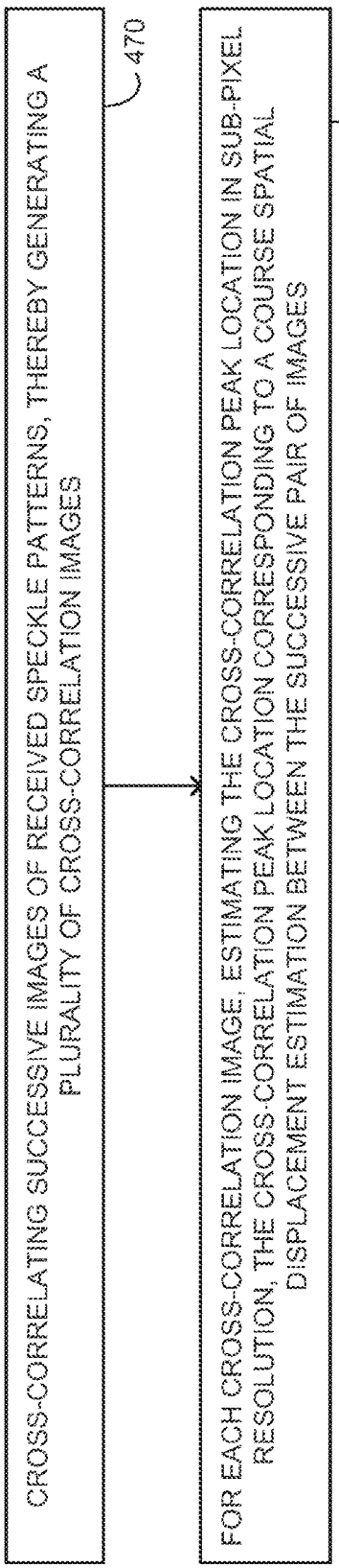

With reference to FIG. 9B, in procedure 470 sequential images of received speckle patterns are cross-correlated, thereby generating a plurality of cross-correlation images. With reference to FIG. 1, processor 106 cross-correlates between sequential images of received speckle patterns acquired by imager 104, thereby generating a plurality of cross-correlated images.

In procedure 472, for each one of the plurality of cross-correlation images, the cross-correlation peak location is estimated in sub-pixel resolution. The cross-correlation peak location corresponds to a coarse relative spatial displacement estimation between the pair of sequential images. Estimating the cross-correlation peak location in sub-pixel resolution may be achieved, for example, by employing the pixel values of the cross-correlated image as sample points and fitting a selected function (e.g., a polynomial of a selected degree) to these sample points (e.g., by employing least squares techniques). The location of the maximum of this function corresponds to the location of the cross-correlation peak. The location of this maximum may be determined at a selected resolution. With reference to FIG. 1, processor 106 estimates the cross-correlation peak location in sub-pixel resolution, for each one of the plurality of cross-correlation images.

Determining Distance from the Speckle Patterns

To produce a seismic map of the area of interest (i.e., to position the results of the optical seismic survey on a map or an image of the area of interest), it is required to know the location of each sensing point on the area of interest. A sampled point is regarded as a point which was illuminated by a laser spot and which the tilt vibrations thereat where measured as described above. When the area of interest is a flat surface, then it is sufficient to know the location and orientation of the seismic surveying system in a reference coordinate system. However, in general, the topography scanned surface (e.g., the ground) is unknown and may include elevations and depression of various sizes. When the area of interest is not a flat surface and exhibits unknown topology, the distance between the seismic surveying system and the sensing points is also required in order to generate the seismic data.

Figure 10:
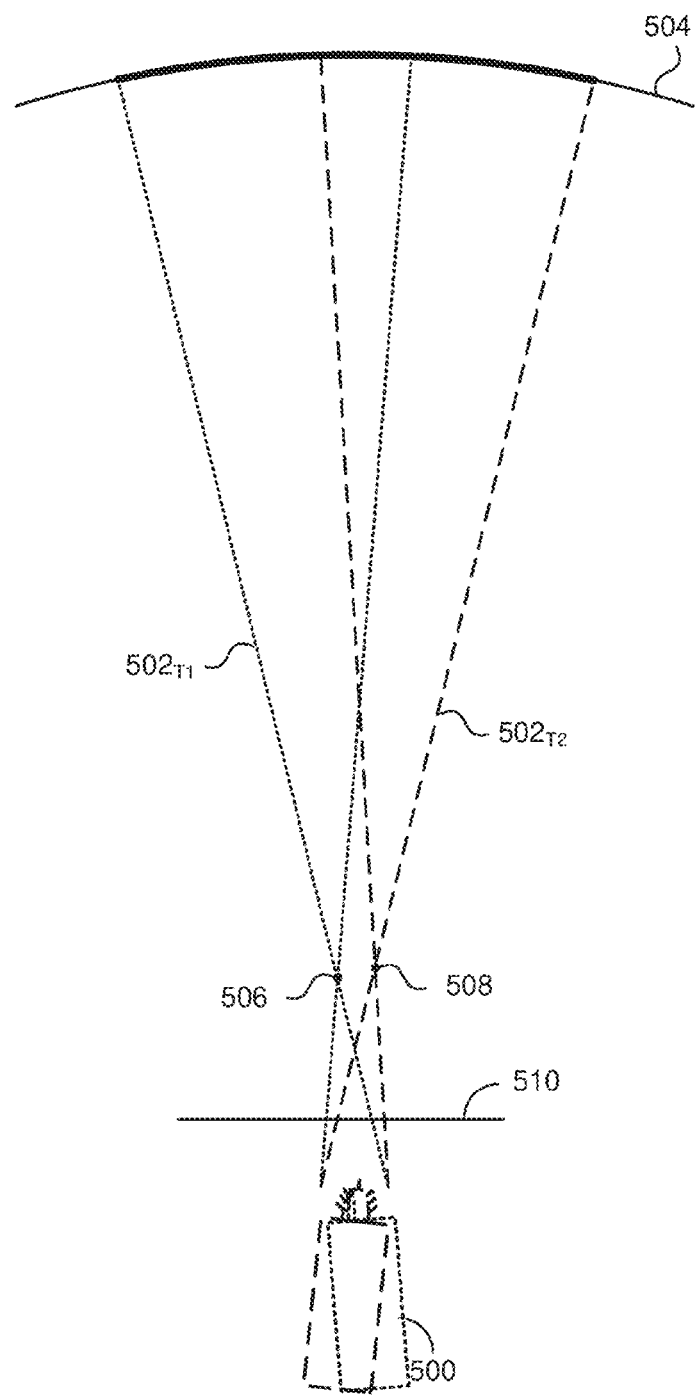
FIG. 10 is a schematic illustration of a laser source directing laser beams toward an area of interest, in accordance with another embodiment of the disclosed technique.

According to one example, the distance between a sampled point and the seismic surveying system may also be determined from the shift of a speckle pattern between subsequent images and known angular displacement of the laser source and imager. Reference is now made to FIG. 10, which is a schematic illustration of a laser source, generally reference 500, directing laser beams toward an area of interest 506, in accordance with another embodiment of the disclosed technique. Laser source 500 directs a laser beam 502 toward a first direction at time T1 (designated $502_{T1}$ in FIG. 10), and directs laser beam 502 toward a second direction at time T2 (designated $502_{T1}$ in FIG. 10), for example due to intended or un-intended angular motion of laser source 500). Laser beam 502 is depicted as practical laser beam, which converge toward a "waist point" and then diverge again toward area of interest 504. At time T1 Laser beam 502 converges toward waist point 506 and at time T2 laser beam 502 converges toward waist point 508. Typically waist point 506 and waist point 508 are located outside laser source 500. The shift of the speckle pattern on the imaging sensor plane is related to the distance between the imager and the sensing point on the ground, and to the angular difference between the first direction (i.e., the direction at time T1) and the second direction (i.e., the direction at time T2) of laser beam 502 as follows:

$$S \cong \frac{M}{P} \cdot \alpha \cdot \left( Z \cdot \frac{L-R}{L-Z} + R \right) \quad (3)$$

where S is the speckle pattern shift in units of pixels (i.e., could be in sub-pixel resolution) on the imaging sensor, M is the imager magnification, P is the size of a pixel in the imaging sensor, $\alpha$ is the angle between the first direction and the second direction, Z is the range from the beams waist to the rotation axis of the multibeam laser source, L is the distance between the imager and the target and R is the range between the imager and the focal plane 512 of the imager (i.e. the plane that appears in focus when imager acquire images of the speckle patter in defocus). The speckle shift in pixels, S, can be determined as described above in conjunction with FIG. 8, $\alpha$ can be determined from platform motion detector 114 (FIG. 1). M, P, Z and R, are known parameters of the imager and of the laser source. Consequently, the distance L between the imager and the target can be determined.

According to another example, the distance between a sampled point and the seismic surveying system may also be determined by employing the parallax between the multibeam laser source and the imager. Due to this parallax, the image location of each laser spot on the imaging sensor depends on the distance to the target. It is noted that the distance is given on the plan defined by the optical axis of the imager and the line between the imager and the multibeam laser source. This relationship is defined according to:

$$P = \frac{-D + R \tan \beta}{2R \tan \alpha / 2} \quad (4)$$

where P is the normalized position of the laser spot on the imaging sensor, given in values between −0.5 to +0.5, relative to the center of the imaging sensor, on a line parallel to the line between the imager and the multibeam laser source, D is the parallax (i.e. the distance between the camera and the laser source), R is the distance between the imager and the laser spot, $\beta$ is the angle between the laser beam trajectory and the optical axis of the imager (i.e. relative to the normal of the FOV of the imager) and $\alpha$ is the total FOV of the imager. Since D, $\alpha$ and $\beta$ are known, and P can be determined from the acquired image of the laser spots, R can also be determined therefrom.

Producing a Seismic Map and Object Detection

As discussed above and referring back to FIG. 1, processor 106 estimates the tilt at each sensing point (i.e., the location of each laser spot on the ground at which the vibrations are measured). As also discussed above, processor 106 determines time signals corresponding to the tilt vibrations of the area of interest at a plurality of sensing points, from the total relative displacements between pairs of sequential images of the received speckle patterns, and produces a seismic map from these tilt vibrations estimations. Specifically, processor 106 determines the amplitude, frequency and phase of the tilt of the ground about two perpendicular horizontal axes (i.e., horizontal relative to the ground plane), where one of these axes is the projection of the viewing direction of imager 104 on the ground and the other axis is perpendicular thereto. In other words, processor 106 determines information relating to 2D tilt vibrations of the ground surface.

These characteristics enable processor 106 to estimate the characteristics (e.g., the amplitude, frequency and phase), of the seismic waves that propagated in the area of interest, and specifically of seismic pressure waves (P-waves and S-waves) as well as surface waves reflected from the objects in the area of interest. Processor 106 employs seismic processing techniques of the seismic waves, such as Common Mid-Point (CMP) gather, to generate a seismic map of the region of interest.

Figure 11:
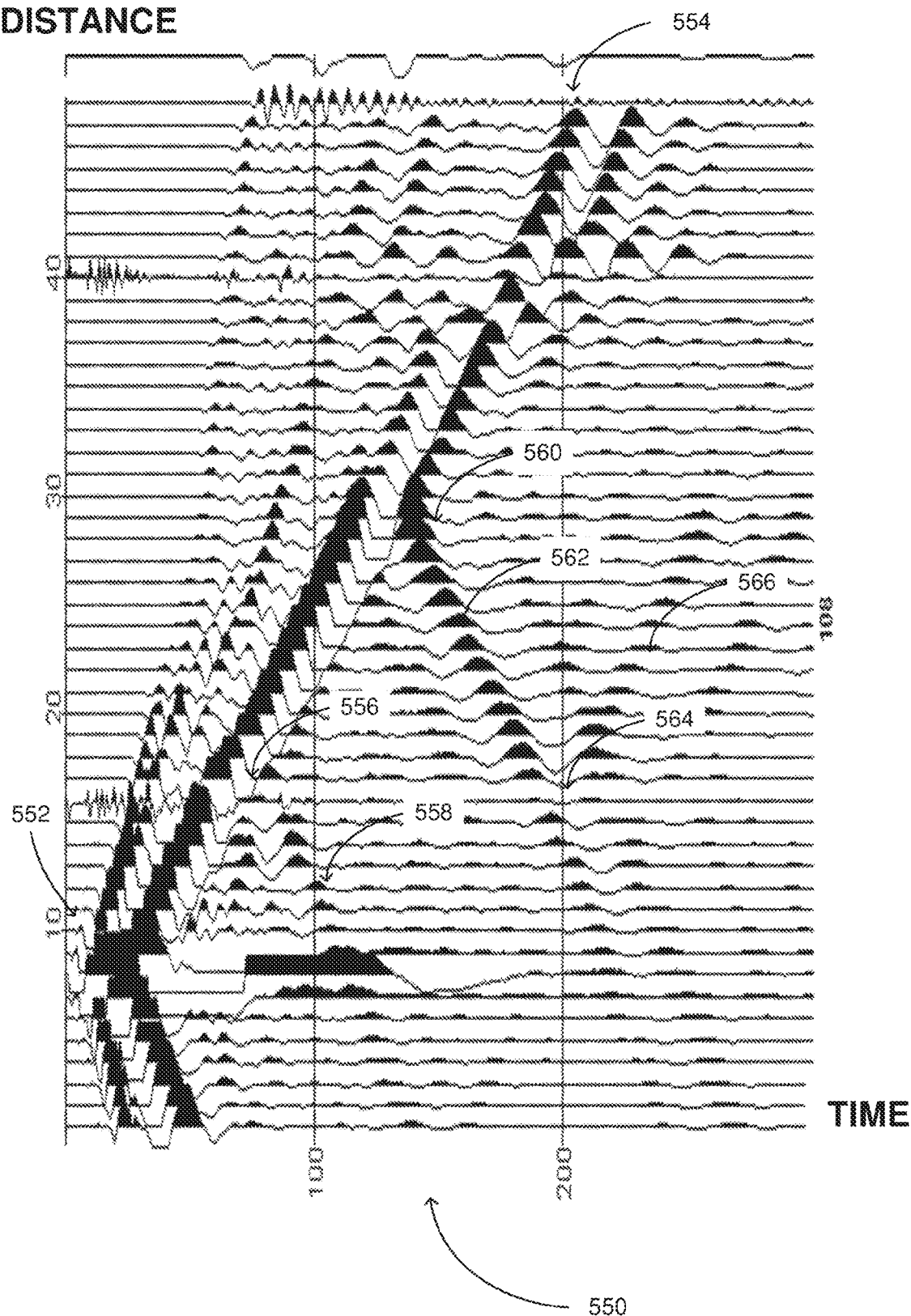
FIG. 11 is a schematic illustration of a seismic map, in accordance with a further embodiment of the disclosed technique.

Reference is now made to FIG. 11, which is a schematic illustration of a seismic map, generally referenced 550, in accordance with a further embodiment of the disclosed technique. Seismic map 550 substantially shows the amplitude, frequency and phase of a seismic wave propagated through an area of interest as a function of distance from a detector and time. The horizontal axis of seismic map 550 represents a time in units of milliseconds and the vertical axis represents distance in meters from the detector and. In general, seismic waves that propagate through the ground are characterized by a number of wave components which can be used to map the structure of the ground. One set of known wave components include pressure waves (e.g., P-waves or S-waves), surface waves (e.g., Rayleigh waves, Love waves). In general, in homogeneous ground, P-waves propagate faster that S-waves which, in turn propagate faster than Rayleigh waves. P-waves, S-waves and Rayleigh waves together describe a single seismic wave. If objects are located in the ground, then the P-waves, S-waves and Rayleigh waves may also undergo reflection, diffraction and seismic refraction. These reflections, diffractions and refractions can be detected by a seismic surveying system according to disclosed technique, and consequently, a seismic map of the ground is generated as well as the location of objects underground. As shown in seismic map 550, a set of P-waves 552 are detected first, followed by a set of surface 554. Changes in the wave characteristics determined from seismic map 550 as a function of distance enable underground objects to be detected and classified.

Processor 106 employs the seismic map to detect the presence of underground objects in the area of interest, to classify these objects and to determine their size. For example, changes in the amplitudes of the wave components in seismic map 550 may indicate the presence of an underground object. Also, features in the seismic map may also indicate the presence of an underground object. With reference to FIG. 11, at point 556 (i.e., at approximately 60 ms after the seismic pulse was generated and 16 meters from the seismic source), an underground object caused a reflection of the surface wave, as indicated by reference number 562. At point 560 (i.e., at approximately 130 ms after the seismic pulse was generated and 28 meters from the seismic source), the underground object caused another reflection of the surface wave, as indicated by reference number 562. At point 564 (i.e., at approximately 200 ms after the seismic pulse was generated and 15 meters from the seismic source), the underground object reflected the reflected the surface wave, indicated by reference number 566.

Also, the seismic map can be employed to determine the Time Of Arrivals (TOAs) of the seismic waves at the sensing points (i.e., at the location of the laser spots) and consequently the local velocity of the seismic wave. From these TOAs, the velocities of the various waves (e.g., pressure waves, surface waves) can be determined. A change in these velocities may indicate the presence of an object. For example, the velocity of a seismic wave in mud is different from the velocity of the seismic wave on solid ground. A change in the velocity of the seismic wave may indicate a mud trap. As a further example, processor 106 determines the spectral distribution over space and time (i.e., how the spectrum of the vibrations change over space and time) of the seismic waves. Different objects shall result in different distributions. It is noted that to generate a seismic map, specifically of seismic waves reflected from underground objects, the direct waves (i.e., the waves produced by the seismic source and which propagated directly to the sensing points without reflections), and other noise sources should be filtered by employing temporal, spectral and spatial filters on the seismic map.

As mentioned above, a system according to the disclosed technique produces a seismic image of the area of interest on which representations of objects detected in the area of interest are superimposed on a geographical map or an image of the area of interest. Since the position and orientation of the system in the area of interest frame of reference (e.g., frame of reference 155—FIGS. 2A-2C), is known (e.g., from location detector 112 and motion detector 114—FIG. 1), and the distance between the imager and each laser spot is also known (as described above), the position of each laser spot in the area of interest frame of reference is also known. When an object is detected, the location thereof is also detected. Accordingly, a representation of the object can be superimposed on a map or an image of the area of interest.

Detection in Motion

As mentioned above, a seismic surveying system according to the disclosed technique may scan the area of interest. In the example presented above in conjunction with FIGS. 2A-2C, the seismic surveying system is located on vehicle 158. As vehicle 158 moves the seismic surveying system scans the area of interest. However, the motion of the vehicle may result in vibrations of the platform. These vibrations of the platform may cause unwanted shifts in the speckle patterns. According to one example, the multibeam laser source and the imager are stabilized toward a selected direction (e.g., a selected elevation and a selected azimuth), for example, relative to the vehicle. As the vehicle moves, the multibeam laser source directs an assemblage of laser beams toward the instantaneous area of interest and the imager acquires imager of speckle pattern respective of each lase spots. Such a scanning scenario is referred to herein as "along-track scanning". Referring back to FIGS. 1 and 2A-2C, processor 106 provides actuator with instructions to move a controlled gimbal, such that multibeam laser source 102 and imager 104 are directed toward a selected direction. This selected direction may be in the frame of reference of a vehicle such as frame of reference 157 of vehicle 158 (both of FIGS. 2A-2C) or in the area of interest frame of reference (e.g., frame of reference 155—FIGS. 2A-2C). As the vehicle (e.g., vehicle 158—FIG. 2) progresses, the motion of the vehicle may cause relative motion between the vehicle multibeam laser source and the imager and the ground. As the vehicle progresses, tracking module 110 provides processor 106 with information relating to the vibrations of system 100. In general, information relating to vibrations of system 100 relates to changes in the position and orientation of multibeam laser source 102 and imager 104 in a frame of reference. According to one alternative, platform motion detector 114 provides processor 106 directly with information relating to the changes in position and orientation of multibeam laser source 102 and imager 104. According to one alternative, platform motion detector 114 provides processor 106 with measurements relating to the linear and rotational accelerations of multibeam laser source 102 and imager 104. Processor integrates these measurements to determine the changes in position and orientation of multibeam laser source 102 and imager 104. After processor 106 determines the changes in position and orientation of multibeam laser source 102 and imager 104, processor instructs actuators 116 to move the controlled gimbal to compensate these changes in position and orientation.

According to another example, a seismic surveying system according to the disclosed technique employs "step-stare scanning". When employing step-stare scanning, the seismic surveying system directs the multibeam laser source and the imager to successive instantaneous area of interest at predetermined time intervals. During each predetermined time interval the multibeam laser source and the imager are rotated about the azimuth and elevation axis as the vehicle moves, such that the laser spot assemblage and the sensor coverage area remain stationary in the reference frame of the area of interest. Referring back to FIGS. 1 and 2A-2C, prior to the start of the scan of the area of interest, tracking module 110 provides processor 106 with information relating to the location of system 100 in area of interest reference frame (e.g., area of interest frame of reference 124—FIG. 1 or area of interest frame of reference 155—FIG. 2). Furthermore, the coordinates of the area of interest (e.g., coordinates of vertices of the area of interest or the coordinates of a central point of the area of interest) are provided to processor 106. Processor 106 determines a first direction from system 100 toward the first instantaneous area of interest and provides actuators 116 with instructions to move a controlled gimbal, such that multibeam laser source 102 and imager 104 are directed toward that first direction.

As the vehicle (e.g., vehicle 158—FIG. 2) progresses, tracking module 110 provides processor 106 with information relating to position orientation and motion of system 100. As the vehicle progresses, processor 106 determines, continuously and in real-time, the required change in the direction toward which multibeam laser source 102 and imager 104 are directed, such that the laser spot assemblage produced by multibeam laser source 102 and the coverage area of imager 104 remain stationary in the reference frame of the area of interest (e.g., area of interest frame of reference 124—FIG. 1 or area of interest frame of reference 155—FIG. 2).

After a predetermined time interval, or when actuators 116 reach the limit of the dynamic range of their motion, processor 106 provides actuators 116 with instructions to direct multibeam laser source 102 and imager 104 toward the next direction corresponding to the next instantaneous area of interest. Similarly to as described above, as the vehicle progresses, processor 106 determines, continuously and in real-time, the required change in the direction toward which multibeam laser source 102 and imager 104 are directed, such that the laser spot assemblage produced by multibeam laser source 102 and the coverage area of imager 104 remain substantially stationary in the reference frame of the area of interest. This process repeats until the area of interest has been scanned. Similar to as described above in conjunction with along-track scanning, during step-stare scanning tracking module 110 provides processor 106 with information relating to the vibrations of system 100 and processor 106 determines the required instructions for actuators 116 to compensate these vibrations.

According to a further example, a seismic surveying system according to the disclosed technique employs circular scanning. During circular scanning, the system is positioned at a plurality of selected location. At each such selected location the system rotates (i.e., changes the azimuth thereof) to scan the area about that selected location. It is noted that the system need not rotate about 360 degrees. In general, at each selected location the system acquires images of instantaneous areas of interest corresponding to selected azimuths.

As discussed above, during the acquisition of the images of the speckle patterns, the motion of the vehicle may cause relative motion between the platform (e.g., the vehicle), the multibeam laser source and the imager and the ground (e.g., vibrations of the seismic surveying system due to motion of the platform). This relative motion is also referred to herein as 'common motion'. The common motion may be estimated from sequential images of the speckle patterns. Consequently, the shift in the speckle pattern resulting only from the vibration of the ground may also be estimated. Common motion results in an additional shift of the speckle patterns (i.e., other than the shift caused by the vibration of the ground). Thus, the total shift of one of speckle patterns (i.e., both due to the vibration of the ground and due to the common motion), in a single image axis (i.e., either the x axis or the y axis of the image) and between two subsequent images is as follows:

$$\begin{pmatrix} ds_1(t) \\ ds_2(t) \\ \vdots \\ ds_N(t) \end{pmatrix} + \begin{pmatrix} a_{1,1} & a_{1,2} & a_{1,3} & a_{1,4} & a_{1,5} & a_{1,6} \\ a_{2,1} & a_{2,2} & a_{2,3} & a_{2,4} & a_{2,5} & a_{2,6} \\ \vdots & \vdots & \vdots & \vdots & \vdots & \vdots \\ a_{N,1} & a_{N,2} & a_{N,3} & a_{N,4} & a_{N,5} & a_{N,6} \end{pmatrix} \cdot \begin{pmatrix} dx(t) \\ dy(t) \\ dz(t) \\ dYaw(t) \\ dPitch(t) \\ dRoll(t) \end{pmatrix} = \begin{pmatrix} dS_1(t) \\ dS_2(t) \\ \vdots \\ dS_N(t) \end{pmatrix} \quad (5)$$

In Equation (2), N relates to the number of regional speckle patterns, $ds_i(t)$ relates to the in-image displacement (i.e., occurring between the acquisition of two subsequent images) of a regional speckle pattern corresponding to body surface location i only due to the vibration thereof. $dSi(t)$ relates to the in-image displacement (i.e., also occurring between the acquisition of two subsequent images) of the regional speckle pattern corresponding to body surface location i due to both the vibration thereof and the common motion. Further in equation (2) $a_{i,j}$ are common motion coefficients in a motion compensation matrix. A respective motion compensation matrix is associated with each regional speckle pattern. Also in Equation (2) dx(t), dy(t), dz(t) relate to the change in the relative position between the multibeam lase source and the imager, and the ground (i.e., between the acquisition times of the two subsequent images) in the x, y and z axes respectively and dYaw(t), dPitch(t) and dRoll(t) relate to the change in the relative orientation the multibeam lase source and the imager, and the ground (i.e., also between the acquisition times of two subsequent images) about the yaw, pitch and roll axes respectively. In vector and matrix notation, equation 2 may be expressed as follows:

$$\vec{s}(t) + M\vec{F}(t) = \vec{S}(t) \quad (6)$$

M is referred to herein as the 'motion compensation matrix' where the entries thereof are $a_{i,j}$ of equation (2), $\vec{s}(t)$ is a vector where the entries thereof are $ds_i(t)$ of equation (2), $\vec{S}(t)$ is a vector where the entries thereof are $dS_i(t)$ of equation (2) and $\vec{F}(t)$, referred to herein as the 'relative motion vector' is a vector where the entries thereof are dx(t), dy(t), dz(t), dYaw(t), dPitch(t) and dRoll(t). According to equation (3), the displacement of a speckle pattern corresponding to laser spot only due to the vibration of the ground, may be expressed as follows:

$$\vec{s}(t) = \vec{S}(t) - M\vec{F}(t) \quad (7)$$

To compensate for relative motion information relating to $\vec{S}(t)$, $\vec{F}(t)$ and M is required. $\vec{S}(t)$ is determined as described above in conjunction with FIGS. 9A and 9B. M is determined either during a calibration process or analytically as further explained below. Thus, only $\vec{F}(t)$) is unknown.

Assuming that the average in-image displacement of speckle patterns corresponding to laser spots, only due to the vibration thereof, is small relative to the in-image displacement due to the common motion, the in-image displacement due common motion may be estimated as follows:

$$M\vec{F}(t) = \vec{S}(t) \quad (8)$$

$\vec{F}(t)$) may be estimated by employing the least squares method as follows:

$$\vec{F}(t) = [M^T M]^{-1} M^T \vec{S}(t) \quad (9)$$

Thus, the of the speckle patterns only due to the vibrations of the ground is determined by employing results of equation (7) with equation (4). It is noted that equation (7) may be incorporated in equation (4) resulting in a single equation to be solved without estimating) $\vec{F}(t)$ as follows:

$$\vec{s}(t) = \vec{S}(t) - M[M^T M]^{-1} M^T \vec{S}(t) \quad (10)$$

It is further noted that, if the motion compensation matrix and the relative motion vector may be estimate by employing singular value decomposition (SVD) on $\vec{S}(t)$. It is also noted that the number of speckle patterns employed for estimating the in-image displacement due common motion relates to the number of motion parameters (i.e., X, Y, Z, Pitch, Yaw, Roll) to be estimated. Each regional speckle pattern may be employed for estimating two motion parameters. For example, for determining the in-image displacement due to common motion in the X, Y and Z axes and about the Pitch, Yaw and Roll axes (i.e., six motion parameters), at least three speckle patterns should be employed.

It will be appreciated by persons skilled in the art that the disclosed technique is not limited to what has been particularly shown and described hereinabove. Rather the scope of the disclosed technique is defined only by the claims, which follow.

The invention claimed is:

1. An optical seismic surveying system comprising:
   a multibeam laser source including a plurality of laser sources and a Diffractive Optical Element, said plurality of laser sources configured to direct respective laser beams toward a single common focal point, said Diffractive Optical Element being located at said single common focal point, said Diffractive Optical Element configured to split each of said laser beams into a plurality of laser beams and to direct said laser beams toward an instantaneous area of interest, said laser beams impinging on said instantaneous area of interest and producing a laser spot assemblage, said laser spot assemblage including a plurality of laser spots;

an imager, directed toward said instantaneous area of interest, said imager including an optical arrangement and an imaging sensor, said imager configured to acquire a plurality of defocused images of speckle patterns produced by diffused reflections of said laser spots from said instantaneous area of interest toward said imager, each speckle pattern corresponding to a respective laser spot and thus to a respective sensing point in said instantaneous area of interest; and a processor, coupled with said imager, said processor configured to determine a relative displacement between corresponding speckle patterns in sequential pairs of images, said processor further configured to determine a respective time signal for each sensing point representing vibrations thereat from said relative displacement between speckles patterns respective of each sensing point.

2. The seismic surveying system according to claim 1, wherein said optical arrangement comprises one or more of:
(i) at least one cylindrical lens, thereby compressing a field of view of said imager,
(ii) a rectangular aperture and a narrow pass filter, and wherein said optical arrangement is telecentric, and
(iii) an apertures matrix.

3. The seismic surveying system according to claim 1, further including a tracking module, coupled with said processor and configured to provide information relating to position and orientation of said seismic surveying system and information relating to motion of said seismic surveying system.

4. The seismic surveying system according to claim 1, wherein said system is configured to employ one of along-track scanning and step-stare scanning.

5. The system according to claim 3, wherein said processor compensating effects of common motion on displacement of each of said speckle patterns.

6. The seismic surveying system according to claim 3, wherein said tracking module includes a platform motion detector and a platform location detector,
wherein, said platform location detector provides information relating to said position of said system in a reference coordinate system, and
wherein said platform motion detector provides information relating to linear and angular motion of said system.

7. The seismic surveying system according to claim 6, wherein said platform location detector includes a Global Positioning System receiver operable to receive signals from GPS satellites and produce information relating to said position of said system.

8. The seismic surveying system according to claim 6, wherein said platform motion detector is an Inertial Measurement Unit, which includes accelerometers providing information relating to linear acceleration of said system and gyroscopes, which provide information relating to angular acceleration of said system.

9. The seismic surveying system according to claim 1, wherein said processor:
(i) further determines a distance between said imager and each of said plurality of laser spots, and/or
(ii) further generates a seismic image of an area of interest on which representations of objects detected in said area of interest are superimposed on a map or an image of said area of interest, and/or
(iii) further configured to produce a seismic map of an area of interest from time signals corresponding to each sensing point and to detect objects in said area of interest from said seismic map, and/or
(iv) further configured to generate a seismic image of said area of interest, said seismic image being at least one of an image and a geographical map of said area of interest with symbols representing detected underground objects superimposed thereon, at corresponding locations.

10. The seismic surveying system according to claim 1, wherein said processor further determines a distance between said imager and each of said plurality of laser spots, wherein said distance between said imager and a laser spot is determined from shift of a speckle pattern corresponding to said laser spot, said shift of a speckle pattern caused by a known angular displacement of a laser beam corresponding to said laser spot, and
Wherein said distance is determined according to:

$$S \cong \frac{M}{P} \cdot \alpha \cdot \left( Z \cdot \frac{L-R}{L-Z} + R \right)$$

where S is a speckle pattern shift in units of pixels, M is a magnification of said imager, P is a size of a pixel, $\alpha$ is an angle between directions of said multibeam laser source, Z is a range from a waist of said beam to a rotation axis of said multibeam laser source, L is distance between said imager and said instantaneous area of interest, and R is a range between said imager and a focal plane of said imager.

11. The seismic surveying system according to claim 1, wherein said multibeam laser source is a pulsed multibeam laser source, and
wherein said imager is synchronized with said pulsed multibeam laser source.

12. The seismic surveying system according to claim 1, wherein said laser sources in said multibeam laser source are divided into a plurality of groups of laser sources, each group includes at least one laser source, where each said group of laser sources is sequentially activated, and
Wherein said imager synchronously acquires images of said speckle patterns respective of each of said laser spots thereby increasing a detection resolution of said seismic surveying system.

13. The seismic surveying system according to claim 1, further including at least another imager, each of said imager and said at least another imager being sensitive at a respective wavelength, and
wherein said laser sources in said multibeam laser source are divided into a plurality of groups of laser sources, each group includes at least one laser source, each said group of laser sources is associated with a respective unique wavelength corresponding to a sensitivity of said imager and said another imager.

14. A seismic surveying method comprising the procedures of:
- directing by a multibeam laser source a plurality of laser beams toward an instantaneous area of interest, said laser beams producing an assemblage of laser spots on said instantaneous area of interest;
- acquiring a plurality of defocused images of speckle patterns produced by diffused reflections of said laser spots from an instantaneous area of interest, each speckle pattern corresponding to a respective laser spot and thus to a respective sensing point in said instantaneous area of interest;
- determining relative displacements between corresponding speckle patterns in pairs of sequential images of received speckle patterns by:
  - estimating a course spatial displacement between said corresponding speckle patterns in each sequential pair of images;
  - aligning each pair of sequential images with each other according to said course spatial displacement estimation;
  - determining a fine relative spatial displacement between said corresponding speckle patterns in each pair of sequential images;
  - estimating a total relative spatial displacement between each pair of sequential images by combining said estimated coarse relative spatial displacement and said determined fine relative spatial displacement with a highest cross-correlation value; and
- determining a respective time signal for each sensing point representing vibrations thereat from total relative displacements between speckle patterns respective of each sensing point.

15. The seismic surveying method according to claim 14, wherein said procedure of determining a fine spatial displacement between each pair of sequential images includes the sub-procedures of:
- determining a frequency domain representation of each course aligned image;
- for each sequential pair of images, applying a selected fine spatial displacement to one image at a selected resolution employing said frequency domain representation; and
- for each sequential pair of finely displaced images, determining a cross-correlation value there between and repeating from said procedure applying a selected fine spatial displacement until a stop criterion is met.

16. The seismic surveying method according to claim 14, wherein said procedure of estimating a course spatial displacement between each sequential pair of images includes the sub-procedures of:
- cross-correlating each of said sequential pair of images of said received speckle patterns, thereby generating a plurality of cross-correlation images;
- for each one of said plurality of cross-correlation images, estimating a location of said cross-correlation peak in sub-pixel resolution, said location of said cross-correlation peak corresponds to said coarse relative spatial displacement estimation.

17. The seismic surveying method according to claim 14, further including the procedure of determining a distance between said imager and each of said laser spots.

18. The seismic surveying method according to claim 17, wherein said distance between said imager and a laser spot is determined from a shift of a speckle pattern corresponding to said laser spot, said shift of said speckle pattern caused by a known angular displacement of a laser beam corresponding to said laser spot, and
wherein said distance is determined according to:

$$S \cong \frac{M}{P} \cdot \alpha \cdot \left( Z \cdot \frac{L-R}{L-Z} + R \right)$$

where S is said shift in said speckle pattern in units of pixels, M is a magnification of said imager, P is a size of a pixel, $\alpha$ is an angle between directions of said multibeam laser source, Z is a range from a waist of said beam to the rotation axis of the multibeam laser source, L is a distance between said imager and said instantaneous area of interest, and R is the range between said imager and a focal plane of said imager.

19. The seismic surveying method according to claim 14, further including the procedures of:
- producing a seismic map of an area of interest from time signals corresponding to each sensing point; and
- detecting objects in said area of interest from said seismic map.

20. The seismic surveying method according to claim 19 further including the procedure of generating a seismic image of an area of interest, said seismic image being at least one of an image and a geographical map of said area of interest, with symbols representing detected underground objects superimposed thereon, at corresponding locations.

21. The method according to claim 14, further including the procedure of compensating effects of common motion on displacement of each of said speckle patterns.

22. The system according to claim 21, wherein said compensating said effects of common motion includes the following:

$$\vec{s}(t) = \vec{S}(t) - M[M^T M]^{-1} M^T \vec{S}(t)$$

wherein $\vec{s}(t)$ relates to displacement of a speckle pattern corresponding to laser spots only due to seismic vibration, $\vec{S}(t)$ relates to displacement of said speckle pattern corresponding to both common motion and seismic vibrations and M is a motion compensation matrix.

* * * * *